(12) United States Patent
Scalise

(10) Patent No.: US 6,918,231 B2
(45) Date of Patent: Jul. 19, 2005

(54) RESILIENTLY COMPRESSIBLE FORCE ABSORPTION SYSTEM CONFORMABLE TO FRUIT

(75) Inventor: Casey M. Scalise, Thornton, CO (US)

(73) Assignee: Osprey Product Development, LLC ( * ) Notice: Subject to any disclaimer, the term of this patent is extended or adjusted under 35 U.S.C. 154(b) by 297 days.

(21) Appl. No.: 10/186,832

(22) Filed: Jun. 28, 2002

(65) Prior Publication Data

US 2003/0003198 A1 Jan. 2, 2003

Related U.S. Application Data

(60) Provisional application No. 60/302,107, filed on Jun. 28, 2001.

(51) Int. Cl.[7] .......................... B65B 25/04; B65D 85/34
(52) U.S. Cl. ............................ 53/416; 53/441; 53/449; 53/461; 53/472; 206/521.2; 206/583; 426/411
(58) Field of Search .................... 53/461, 441, 416, 53/449, 472, 466; 206/521.1, 583, 521.2, 523; 426/410, 411, 413, 415; B65B 25/04; B65D 85/34

(56) References Cited

U.S. PATENT DOCUMENTS

| | | | | |
|---|---|---|---|---|
| 588,690 A | * | 8/1897 | Brown | 206/521.2 |
| 882,134 A | * | 3/1908 | Woodard | 206/521.2 |
| 1,123,884 A | * | 1/1915 | Jones et al. | 206/521.2 |
| 1,149,489 A | * | 8/1915 | Bache | 206/521.1 |
| 1,685,393 A | * | 9/1928 | Beadle | 53/441 |
| 2,452,174 A | * | 10/1948 | Arnold | 206/521.2 |
| 2,687,246 A | * | 8/1954 | Randall | 206/521.1 |
| 2,956,672 A | * | 10/1960 | Kirkpatrick | 53/449 |
| 4,795,033 A | * | 1/1989 | Duffy | 426/112 |
| 5,308,630 A | * | 5/1994 | Nordahl | 426/412 |
| 5,653,345 A | * | 8/1997 | Knoss et al. | 206/521.6 |
| 6,161,331 A | * | 12/2000 | Lalane | 47/73 |
| 6,612,440 B1 | * | 9/2003 | Agulnik | 206/521.2 |

FOREIGN PATENT DOCUMENTS

| | | | | |
|---|---|---|---|---|
| DE | 29818670 U1 | * | 7/1999 | B65D/85/34 |
| JP | 01199815 A | * | 8/1989 | B65B/25/04 |
| JP | 04327111 A | * | 11/1992 | B65B/25/04 |
| JP | 05112311 A | * | 5/1993 | B65B/25/04 |
| JP | 07330056 A | * | 12/1995 | B65D/85/34 |

* cited by examiner

Primary Examiner—Stephen F. Gerrity
(74) Attorney, Agent, or Firm—CR Miles P.C.; Craig Miles

(57) ABSTRACT

A fruit protection and transportation system providing various apparatus and methods to absorb impact and compression forces to reduce damage to fruit (3). Particular embodiments of the invention comprise a fruit protector blank (1) of resiliently compressible force absorption material having a substantially planar surface (2) that can be conformed to a portion of the exterior surface of various kinds of fruit (3). Other embodiments of the invention provide a molded force absorption cover (21) of resiliently compressible foam material that elastically conforms to a portion of the exterior surface of a fruit (3).

22 Claims, 19 Drawing Sheets

A—A

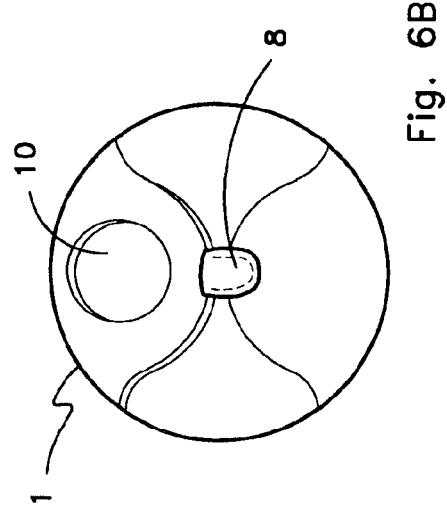
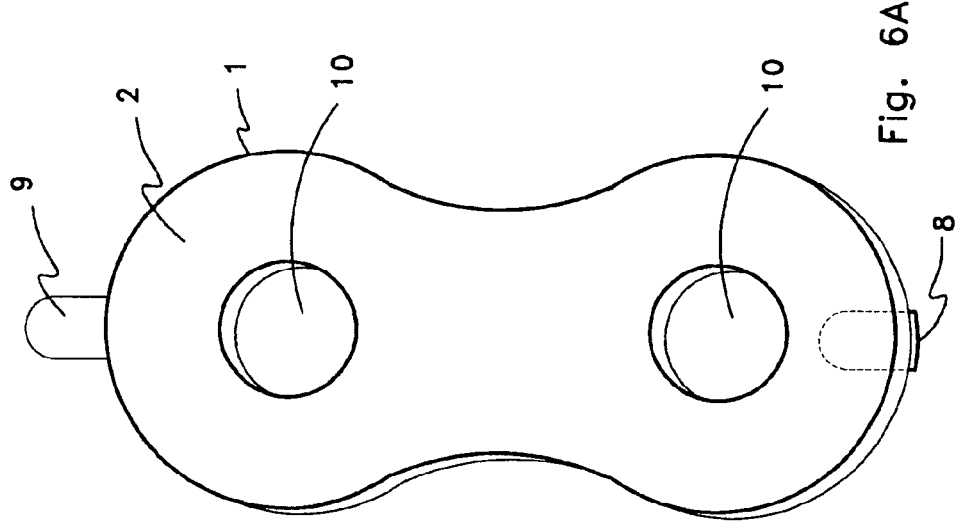

A-A

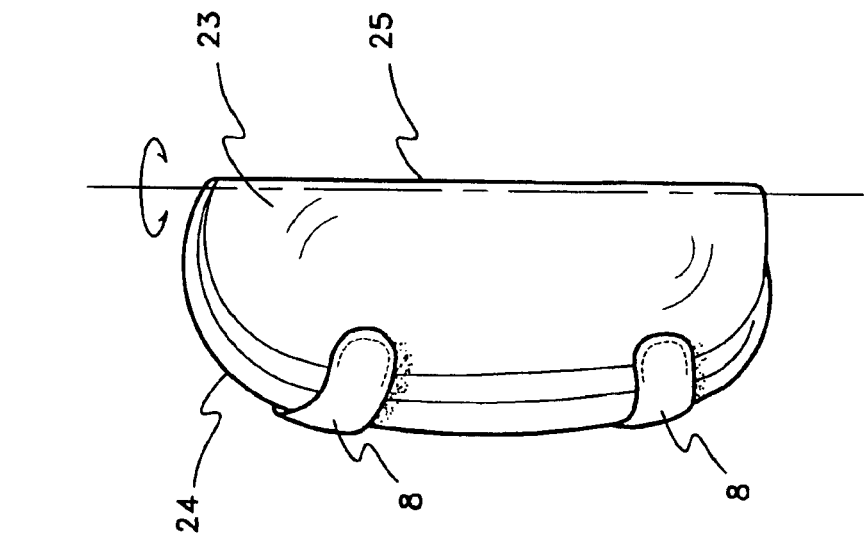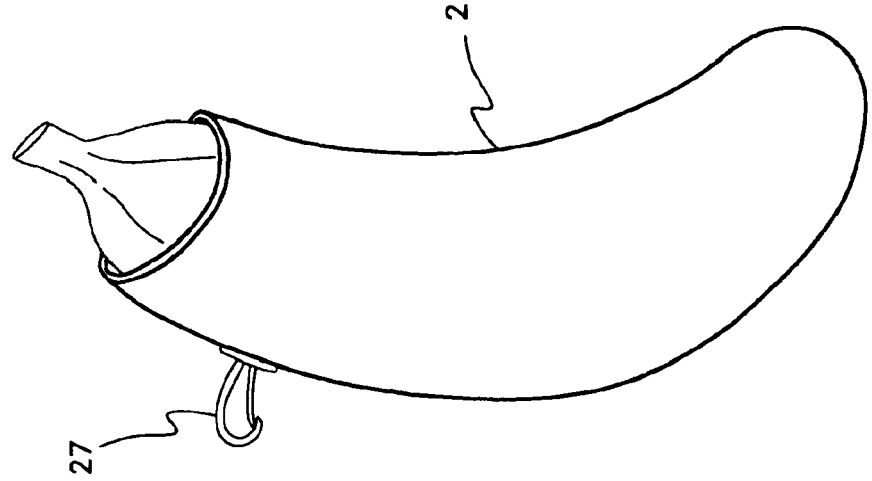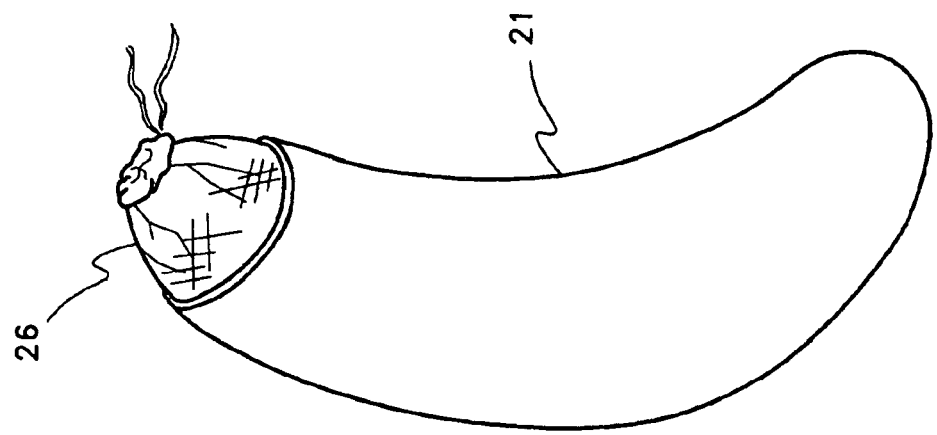

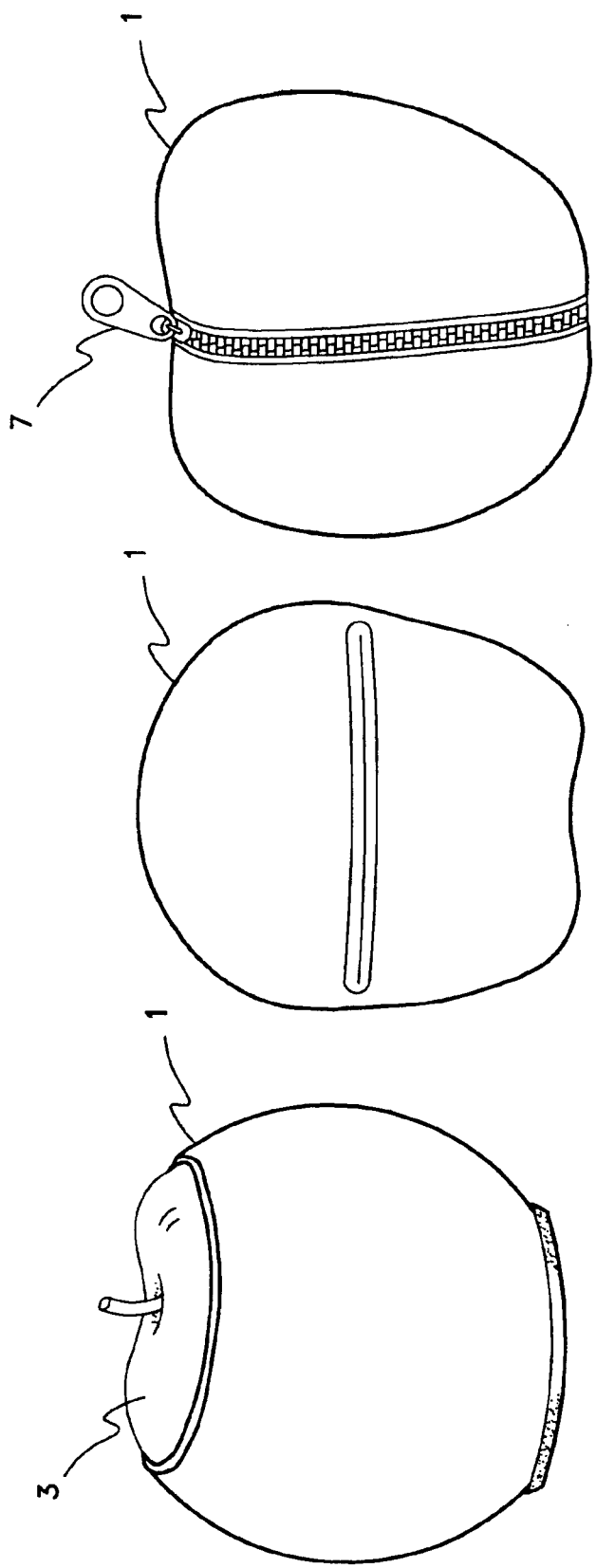

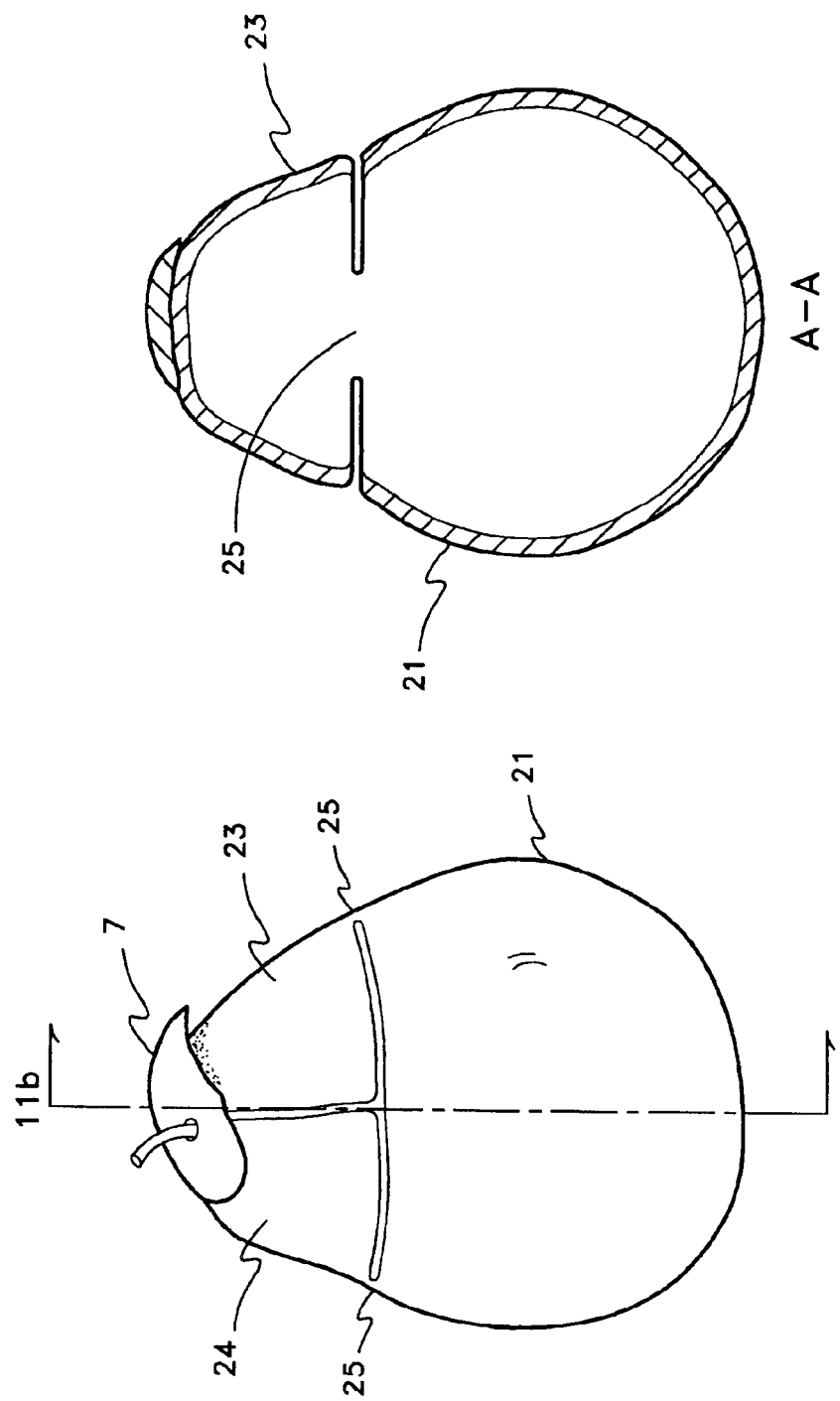

RESILIENTLY COMPRESSIBLE FORCE ABSORPTION SYSTEM CONFORMABLE TO FRUIT

This application claims the benefit of U.S. Provisional Patent Application No. 60/302,107, filed Jun. 28, 2001, hereby incorporated by reference herein.

A force absorption system conformable to a portion of the exterior surface of various types or kinds of fruits or vegetables provides damage protection during transportation and storage.

BACKGROUND

Fruit damage can occur during handling, packing, transporting, or storing fruit and is primarily caused by either mechanical impact or compression forces. Merely holding fruit can cause bruising and fruit pickers are trained to touch fruit only by the fruit stem. Damage to loose stone fruit, such as peaches or avocados, can be caused by the stone, pit, or seed(s) moving inside the fruit during handling, packing, or transportation resulting in internal damage which may not be visible until the fruit is cut or eaten.

Damage to fruit can be immediately apparent at the time when it is cut, crushed, or punctured. However, other types of damage may not be apparent for a period of time, such as, fruit pitting associated with damage to cells near the epidermis that collapse over a period of time or fruit bruising associated with injury to cells much below the epidermis.

Upon being damaged fruit respiration and ethylene production increases making the fruit more susceptible to decay. Bruising can also result in localized softening of the fruit, the presence of secondary microbial infection, and increased acidity compared to undamaged fruit. Discoloration of fruit results when an enzyme called polyphenoloxidase oxidizes the phenolic compounds that are found in the tissue of fruits. The oxidation causes the phenolic compounds to condense into brown spots. While the tissue, or cell structure, remains intact, the enzyme and phenolic compounds are separated and so do not react with one another. Damage of the cell structure caused by impact or compression of the fruit initiates the oxidation reaction and so triggers the onset of browning.

Because fruit are delicate and susceptible to damage numerous types of containers, carriers, holders, or hangers have been devised to reduce damage to fruit.

Containers, crates, or boxes are commonly used to transport or store fruit. Such containers, crates, or boxes are typically formed of injection molded plastic(s) or paperboard(s). When assembled, such containers are typically rectangular in shape, having a flat base surrounded by four upstanding flat side panels as disclosed for example by U.S. Pat. Nos. 6,286,701; 5,431,335; 6,394,296; 6,015,056; or 6,398,054. More familiar to the individual consumer is the sandwich, lunch, or storage container having a releasably sealable cover as disclosed by U.S. Pat. No. 5,174,452.

A significant problem with these types of containers can be that fruit placed inside can move, shift, or vibrate in response to movement of the container. Even fruits having a thick skin or a peel, such as a banana, can be damaged by movement or vibration within a container causing the fruit to abrade, become soft, or discolor.

A conventional solution to protect fruit transported in such containers, crates, or boxes, may be a flexible liner inserted into the container prior to placing the fruit within as disclosed by U.S. Pat. Nos. 5,617,711 or 6,247,328. However, a problem with flexible liners made from thin plastic sheet material as disclosed may be that it does not absorb incident impact or compression forces. Unabsorbed impact or compression forces can be transmitted through the liner to that portion of the exterior surface of the fruit in contact with the flexible liner. Another problem with flexible liner material may be that it does not provide sufficient frictional engagement with the exterior surface of the fruit to prevent movement of the fruit relative to the liner allowing fruit damage by impact, compression, vibration, or abrasion forces.

Alternately, the bottom or side panels of the containers, crates, or boxes may be made flexible to conform to the fruit pressing against them as disclosed by U.S. Pat. No. 6,386,388. However, flexure of a container panel as disclosed may not provide sufficient absorption of incident forces to protect fruit in contact with the flexible panel. The lack of a compressible surface may in large part allow transmission of impact or compression forces through the panel to the fruit. Moreover, flexible panels may not generate sufficient frictional engagement with the fruit to prevent damage from fruit movement relative to the flexible panel as above described.

Containers, crates, or boxes that provide rigid recesses or cups for individual fruit, as disclosed by U.S. Pat. Nos. 5,653,345 or Des. 328,705 are configured such that an individual recess or cup or each of a plurality of recesses or cups is formed with a substantially identical shape or volume. Because individual pieces of fruit vary in size and shape, rigid containers may not have surfaces that conform to the exterior surface of individual pieces of fruit. Additionally, there may not be sufficient frictional engagement with the exterior surface of the fruit to prevent movement within the individual recess or cup. Moreover, the walls of rigid recesses or cups may not afford the degree of compressibility necessary to absorb forces of impact generated by movement of the fruit within the recess or cup, as such fruit damage may not be minimized.

Because containers, crates, or boxes typically do not operate to protect fruit in isolation but rather act in concert with the larger conveyance in which they are transported, such as a truck or a ship, it is understandable that such containers, crates, or boxes do not provide additional impact and compression force absorption elements that may already provided by the functional structure of the truck, ship, or other conveyance, as such they can be lacking.

Similarly, conventional films that wrap, cling, stretch, or shrink to conform to a portion of the exterior surface of fruits or vegetables, such as the film technology disclosed by U.S. Pat. No. 5,914,144, provide a thin and substantially non-compressible material that present surfaces that may not afford a sufficient degree of resiliency or compression to absorb incident impact or compression forces to prevent or minimize fruit damage.

Conventional fruit and berry pickers' containers such as those disclosed by U.S. Pat. Nos. 5,201,446 and 4,184,528, are configured to allow collection of numerous fruit in a single enclosed volume. As such, these types of containers are not configured to conform to the exterior surface of individual pieces of fruit or provide a sufficient amount of frictional engagement with the fruit to prevent or minimize movement of the fruit within the container which can result in pitting or bruising of the fruit.

Relating to fruit protection technology in general, and specifically with regard to a force absorption system for fruit that provides sufficient force absorption characteristics, conformability characteristics, frictional engagement characteristics, to protect individual pieces of fruit, bunches of fruit, or loose fruit, such as berries, cherries, or grapes when handled, transported, or stored, it can be understood there are an array of fruit protection problems that remain unresolved. The numerous embodiments of the invention address each these above-mentioned problems.

SUMMARY OF THE INVENTION

A broad object of the invention can be to provide fruit protectors configured to protect various types or kinds of fruit or vegetables from damage. An aspect of this object of the invention can be to protect the fruit from impact, compression, puncture or abrasion damage to the epidermis of fruit. A second aspect of this object of the invention can be to protect fruit cells proximate to or well below the epidermis from impact or compression forces. A third aspect of this object of the invention can be to prevent damage to the interior fruit cells from movement of seeds or pits within "loose stone" fruit.

Another broad object of the invention can be to provide fruit protectors that conform to a portion or to the entire exterior surface of a fruit. Conformance of the fruit protector to the configuration of the exterior surface of the fruit can reduce the movement of the fruit within the protector, thereby reducing impact force generated by fruit impacting the surface of the fruit protector.

Another broad object of the invention can be to provide fruit protectors that provide sufficient compressible force absorption material to absorb a portion or all impact or compression forces incident upon the fruit protector's exterior surface. As to an individual type or kind of fruit the cell volume, cell type, density, resiliency, or compressibility of the force absorption material can be adjusted as necessary or desired to allow the selected level of protection from impact forces.

Another broad object of the invention can be to provide fruit protectors that are substantially planar for storage but operably conform to a portion or the entire exterior surface of a fruit.

Another broad object of the invention can be to provide fruit protectors molded from resiliently compressible force absorption material configured to elastically conform to a portion or the entire exterior surface of a fruit.

Another broad object of the invention can be to provide rigid shells that structurally conform force absorbing material to a portion or the entire surface of a fruit.

Another broad object of the invention can be to provide a fruit protector that provides releasable securement to a container, garment, accessory, or the like. One aspect of this object can be to limit movement of the fruit protector relative to the surfaces of the container, garment, or accessory. A second aspect of this object can be to provide a convenient method of transporting fruit within a container, by movement of a human, or by movement of a non-human animal.

Another broad object of the invention can be to market fruit. An aspect of this object can be to display fruit protectors proximate to the fruit the fruit protector is configured to protect. Another aspect of this object can be to display fruit protectors in a manner that generates additional interest in the area in which fruit is displayed.

Naturally further objects of the invention are disclosed throughout other areas of specification and claims.

BRIEF DESCRIPTION OF THE DRAWINGS

FIGS. 6A and 6B show various embodiments of the planar fruit protector invention to protect a peach from some impact and compression forces.

FIGS. 8A–8C show various embodiments of the molded fruit protector invention to protect a banana from some impact and compression forces.

FIGS. 10A–10C show various embodiments of the molded fruit protector invention to protect an apple from some impact and compression forces.

FIGS. 11A and 11B show a particular embodiment of the fruit protector invention that provides a molded force absorption cover that elastically conforms to a portion of the exterior surface of a pear.

DETAILED DESCRIPTION OF THE PREFERRED EMBODIMENTS

Figure 1A:
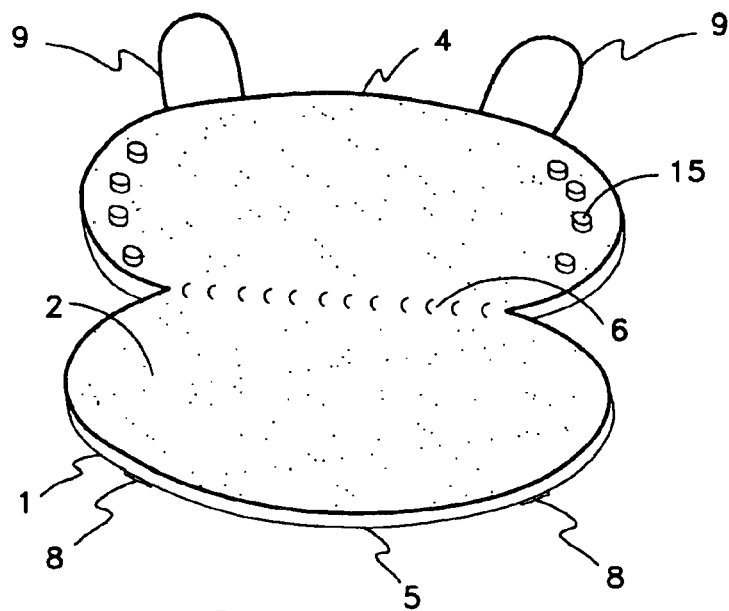
FIGS. 1A–1C show how to use a particular embodiment of a fruit protector invention that provides a resiliently compressible force absorption material having a substantially planar surface that operably conforms to a portion of the exterior surface of a banana.

A system for the protection, transportation, or storage of fruit that provides various resiliently compressible fruit protectors that conform to a portion or the entirety of the exterior surface of numerous kinds of fruit to absorb impact and compression forces.

While various embodiments of the invention are illustrated or described for use in protecting, transporting, or storing commonly known types of fruit such as bananas, apples, pears, peaches, or the like, these particular examples of fruit protectors or fruit are not meant to limit the scope of the invention to these examples but rather the examples are meant to be illustrative of how to make and how to use the numerous embodiments of the invention to protect, transport, or store a wide variety of fruits, melons, or vegetables that are available to the consumer, including, but not limited to various species or varieties of: peaches, nectarines, apricots, plums, apples, bananas, quinces, persimmons, bread fruits, carambolas, guavas, pears, paw paws, star fruits, papayas, mangos, ugli fruits, watermelons, cantaloupes, bananas, pomegranates, pineapples, avocados, oranges, tangerines, grapefruits, limes, lemons, tomatoes, tomatillas, kiwis, or the like; along with berry fruits such as, strawberries, raspberries, black berries, cherries, or the like; and bunch fruits such as of grapes.

Now referring primarily to FIGS. 1A–1C, 3A–3C and 5A and 5B, which provide examples of basic embodiments of the invention, a fruit protector blank (1) configured for individual types of fruit (3) can be cut, formed, or molded from a resiliently compressible force absorption material having at least one substantially planar surface (2) conformable to an exterior portion of a fruit (3). As can be understood, with respect to each individual fruit, or with respect to different types of individual fruits, numerous configurations of fruit protector blanks (1) can made which can be conformed to the portion of the exterior surface of a particular fruit as necessary or desired.

The resiliently compressible force absorption material from which the fruit protector blank (1) can be cut, formed, or molded can be a foam material generated by mixing a polymer or foamable material such as: polypropylene, urethane, polyurethane, olefin foam, polyolefin, latex, ethylene vinyl acetate, or similar polymer, with a catalyst, such as: N,N,N',N'-Tetramethyl-1,6-hexanediamine; N,N,N',N'-Tetramethyl-1,3-propanediamine; N,N,N',N'',N''-Pentamethyl-diethylenetriamine; N,N-Dimethylcyclohexylamine, 70% Bis[2-(dimethylamino)ethyl] ether/30% Dipropylene glycol; N,N',N''-Tris[3-(dimethylamino)propyl]-hexahydro-s-triazine; N,N-Dimethylbenzylamine; N,N-Dimethylbenzylamine; 4-Methylmorpholine; 4-Ethylmorpholine; Triethylenediamine; 33% Triethylenediamine/67% Dipropylene glycol; isothiocyanate; or the like. A blowing agent can be used introduce the catalyst into the polymer or foamable material to generate foaming which establishes cells or voids in the foam material.

Foam material suitable for use with the invention can have either an "open cell" or "closed cell". For example, polyurethane foam can be manufactured to have an "open cell" that provides numerous voids within the foam material through which gases or liquids can pass through. Alternately, for example, latex foam can be manufactured with a "closed cell" that does not allow gases or liquids to pass through. Often closed cell foam is referred to as "waterproof" foam material because it will not allow liquids to pass through the cells or voids.

The density of a foam material is determined by dividing the foam material weight by its volume. The density can be adjusted by increasing or decreasing the cell volume or void volume within the foam material. Low-density foam material is generally considered to have a density of 1.9 pounds per cubic foot or less. High-density foam material is generally considered to be a density of 2.0 pounds per cubic foot or greater.

Compression characteristics of foam material can be measured by exerting force against the foam material with a flat compression foot larger than the footprint of the foam material specimen tested. These tests measure the pounds of force it takes to compress the foam material. A value called the Compression Force Deflection (CFD) or Compression Load Deflection (CLD) can be expressed as pounds of force exerted at 25%, 40%, 50%, or 65% compression of the foam material. The higher the CLD number the firmer the foam. Firmness can be controlled by the way the foam material is formulated, whereas density is determined by the total weight of foam ingredients per unit volume. Moreover, density and compression are not related. You can have either a soft foam material or a firm foam material at the same density.

Resiliency corresponds to the spring the foam has, surface liveliness or spring-back ability. Resiliency is measured with a Ball Rebound test. A steel ball is dropped onto the foam material sample from a fixed height. Resiliency is expressed as a percentage of ball rebound against the original height of the ball drop.

The invention can be practiced using foam material(s) having numerous combinations or permutations of density, compression, or resiliency, whether open cell or closed cell, so long as the cured foam material can be molded, or can be cut, to provide the fruit protector blank (1) with at least one substantially planar surface (2) which can be conformed to at least a portion of the exterior surface of a fruit (3) at atmospheric pressure and at temperatures between about 32° F. and about 120° F. Depending on the exterior surface configuration of the fruit and the degree of conformance to the exterior surface of such fruit necessary or desired, the formulation of the foam material may be altered accordingly by varying: the polymer, the catalyst, the degree of density, the CDL, or resiliency until the degree of conformance to the exterior surface of the fruit, whether necessary or desired, is achieved.

Figure 15B:
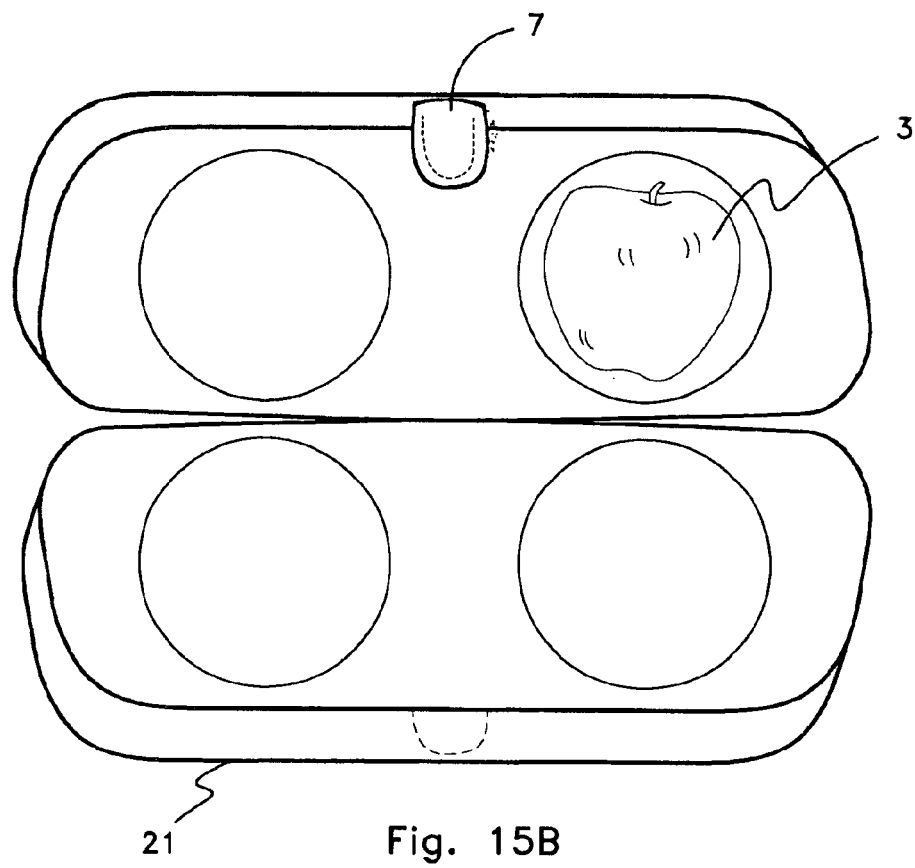
FIGS. 15A and 15B show a particular embodiment of the fruit protector invention that provides protection for a plurality of fruit.
Figure 15A:
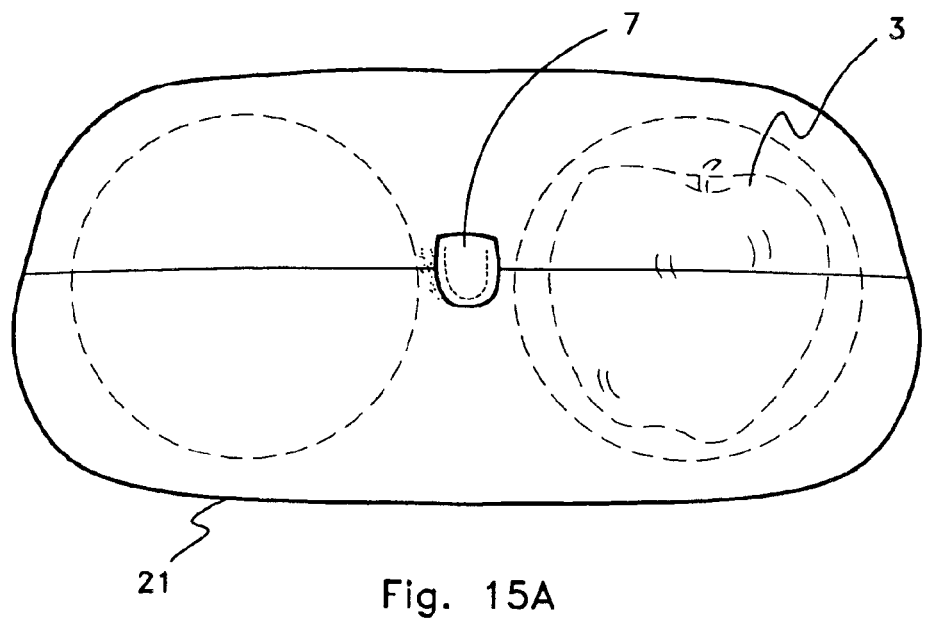

Certain embodiments of the invention can further comprise a foam material that can be heat formed to induce the foam material to maintain a conformation that corresponds to a portion of the exterior surface of a particular fruit, or makes conformance of the foam material with the exterior surface of the fruit more readily obtainable, as shown in FIG. 15.

The description of foam material provided is not intended to limit the scope of the invention only to foam material as described above and can be practiced using numerous types or kinds of resiliently compressible materials that can be cut, configured, and then conformed to the exterior of a fruit as described, such as, bubble type materials (e.g. bubble pack), flex channel material (e.g. flex channel), or the like.

Figure 3A:
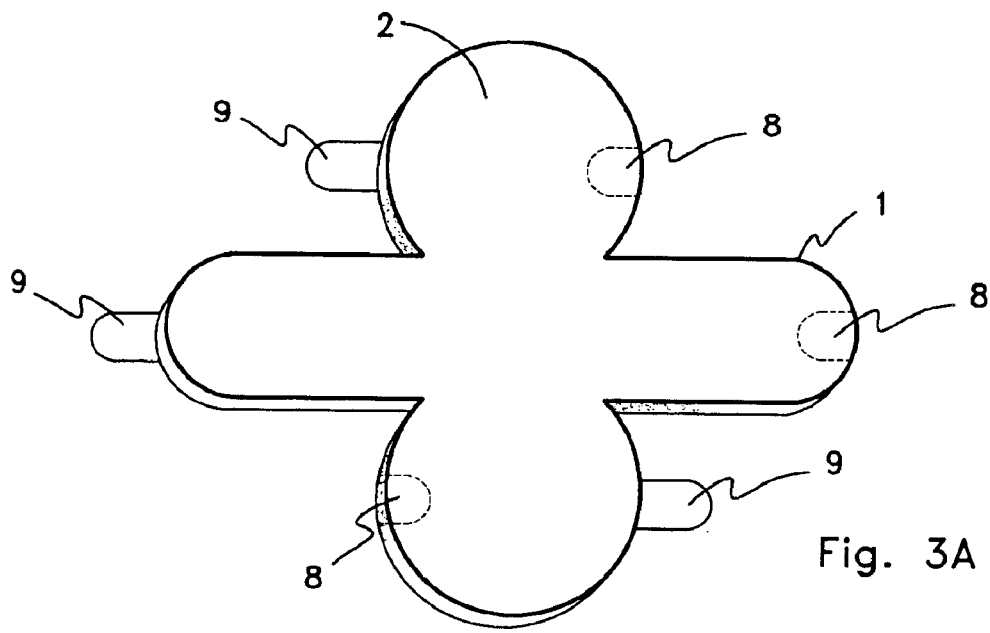
FIGS. 3A–3C show a particular embodiment of a fruit protector invention that provides a resiliently compressible force absorption material having a substantially planar surface that operably conforms to a portion of the exterior surface of an apple.
Figure 3B:
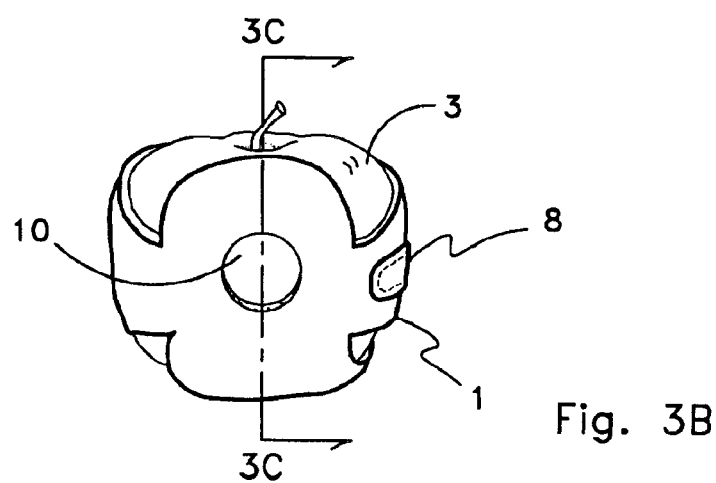

Again referring primarily to FIGS. 1A–1C, 3A–3C and 5A and 5B, the various embodiments of the fruit protector blank (1) can be cut from a sheet of resiliently compressible foam material (or as described above other resiliently flexible materials can be used as well) having at least one substantially planar surface (2). The fruit protector blank may be perforated with an aperture, or plurality of apertures (10), that traverse the distance between the substantially planar surface (2) and the opposing surface of the fruit protector blank (1) and as to some embodiments of the invention can form a pattern (as shown by FIG. 3B).

Conforming the substantially planar surface (2) of the resiliently compressible foam material to a portion of the exterior portion of the fruit (3) generates sufficient frictional engagement between the substantially planar surface of the fruit protector blank (1) and a portion of the exterior surface of the fruit (3) to retain the fruit (3) within the conformed fruit protector blank (1). The frictional engagement can be maintained by engaging operably mated closure elements (8)(9) to maintain conformance between the substantially planar surface of the fruit protector blank the portion of the exterior surface of said fruit to retain the fruit (3) within the conformed fruit protector blank (1).

Figure 1B:
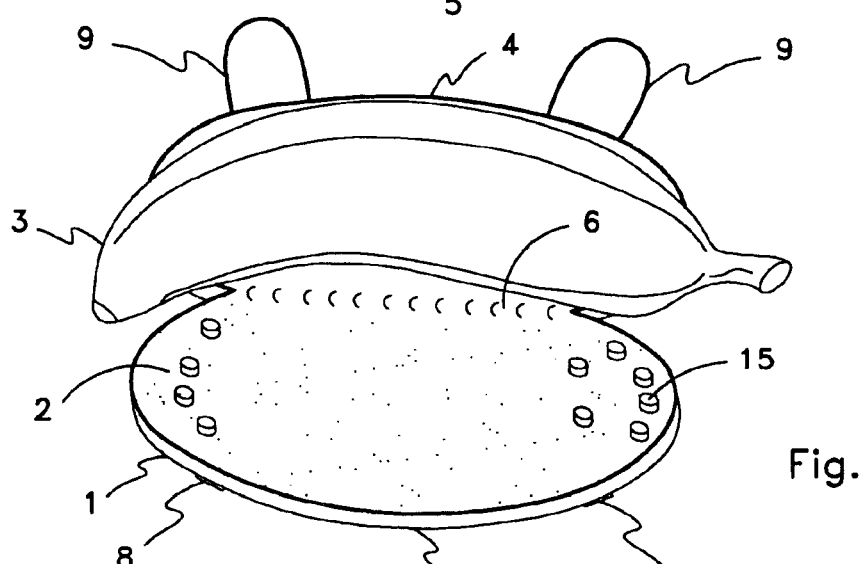
Figure 1C:
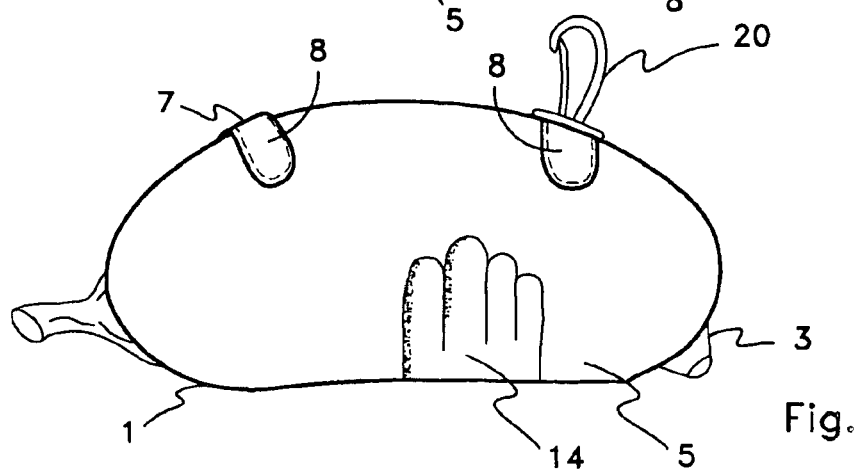

Now referring primarily to FIGS. 1A–1C, a particular embodiment of the fruit protector invention can provide protection for a banana. A fruit protector blank (1) can be cut from resiliently compressible foam material to establish a first force absorption element (4) having a substantially planar surface (2) configured to operably conform to a portion of the exterior surface of a banana (3); a second force absorption element (5) having a substantially planar surface configured to operably conform to a second portion of the exterior surface of said banana; a hinge element (6) which provides a rotation axis about which said first force absorption element (4) and said second force absorption element (5) rotate. In particular embodiments of the banana protector invention, the first force absorption element (4), the second force absorption element (5), and the hinge element (6) can be cut from a single piece of foam material having a continuous integral planar surface (2) that operably conforms to a portion of the exterior surface of a banana (3).

A particular embodiment of a banana protector can be made using "closed cell" ethylene vinyl acetate foam material having a thickness of between about one-eighth inch to about one-half inch with a density of between about one pound per cubic foot and about three pounds per cubic foot and CLD of between about one-half pound and about two pounds at 25% compression and a resiliency based on the Ball Rebound test of between about 45% to about 75% can be cut (e.g. using a rule and die) in a configuration that can be conformed to at least a portion of the exterior surface of the banana (3) as illustrated by FIG. 1.

The resiliently compressible force absorption elements (4)(5) can be conformed to the exterior surface of the banana (3) to the extent necessary to obtain sufficient frictional engagement between the substantially planar surface (2) of the force absorption elements (4)(5) and a portion of the exterior surface of the banana (3) to retain the banana (3) within the force absorption elements (4)(5).

Retention of the banana (3) by frictional engagement obtained with the force absorption elements (4)(5) can be maintained by engaging at least one discrete closure (7) having operably mated closure elements (8)(9) coupled to the fruit protector blank (1). For example, without limiting the scope of the numerous closures or closure elements that can be used with the invention, as shown by FIG. 1 the closure can comprise a hook material that operably mates with a loop material (e.g. Velcro®). The hook and loop closure can comprise a single discrete closure (e.g. a single hooked tab that mates with a corresponding sized loop) or a plurality of discrete closures.

Figure 2A:
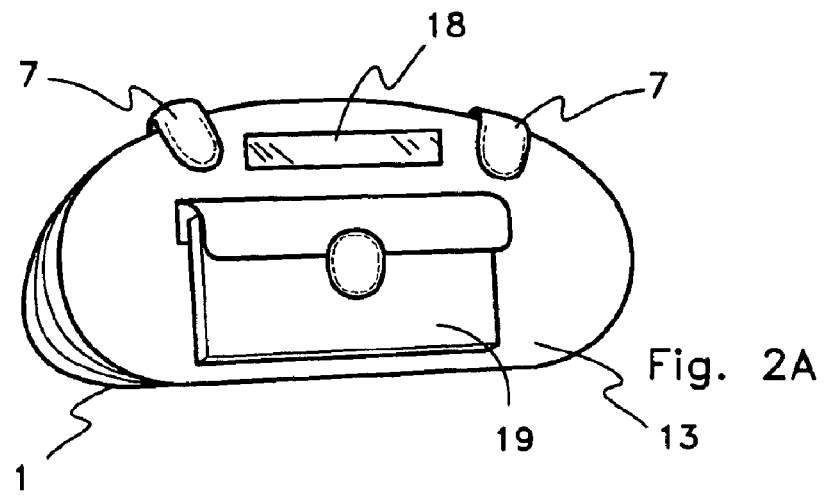
FIGS. 2A–2C show various embodiments of the planar fruit protector invention to protect a banana from some impact and compression forces.
Figure 2B:
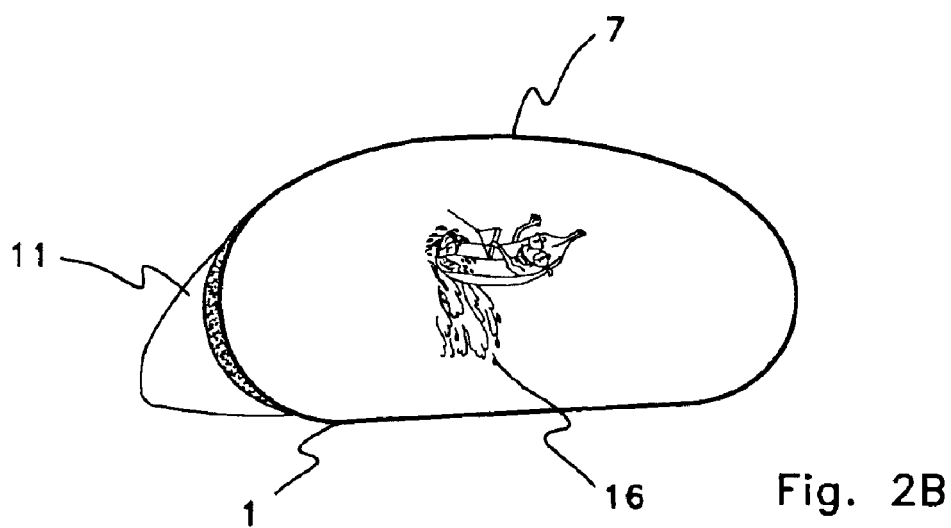
Figure 2C:
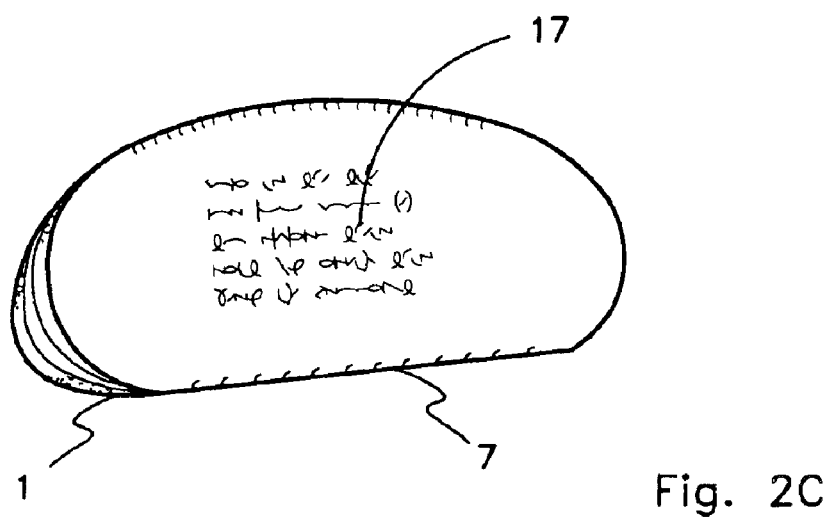

Now referring to FIGS. 2A–2C, embodiments of the banana protector invention can further include a closure (7) that comprises a permanent bond between perimeter portions of the fruit protector blank (1)(as shown by FIG. 1C). Other embodiments of the invention can further include a elastically conformable material 11 joined to the perimeter of the fruit protector blank (1). The elastically conformable material 11 can respond to pressure exerted against its surface from a banana (3) inserted into the banana protector. Alternative embodiments of the banana protector can include a closure (7) that comprises a zipper, or a clasp, an eyelet, or other similarly operably mated closure elements either individually or in combination.

Now referring to FIGS. 1A–1C, 3A–3C, 5A and 5B, and 6A and B, additional embodiments of the invention can provide a fruit protector blank (1) having a substantially planar surface (2) that can be conformed to a portion of the exterior surface of a fruit (3).

Figure 3C:
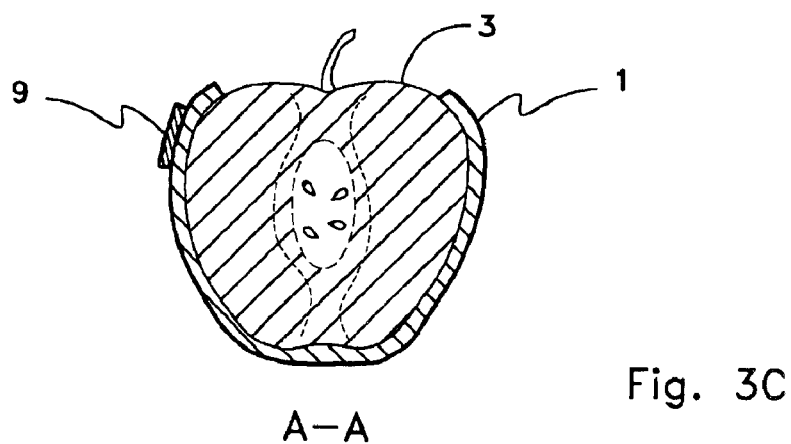
Figure 4A:
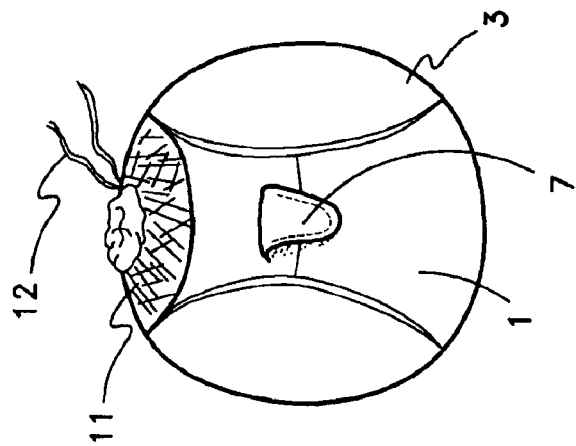
FIGS. 4A–4C show various embodiments of the planar fruit protector invention to protect an apple from some impact and compression forces.
Figure 4B:
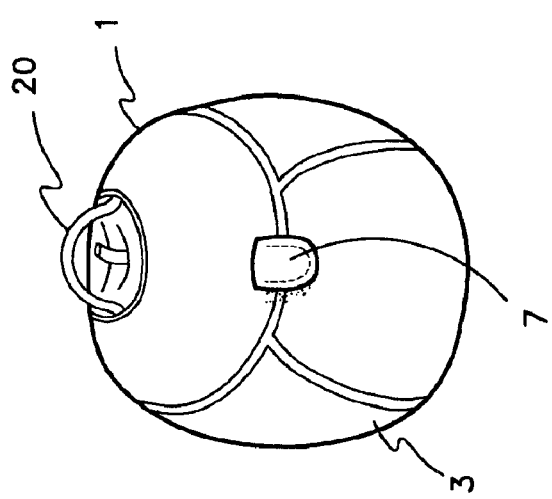
Figure 4C:
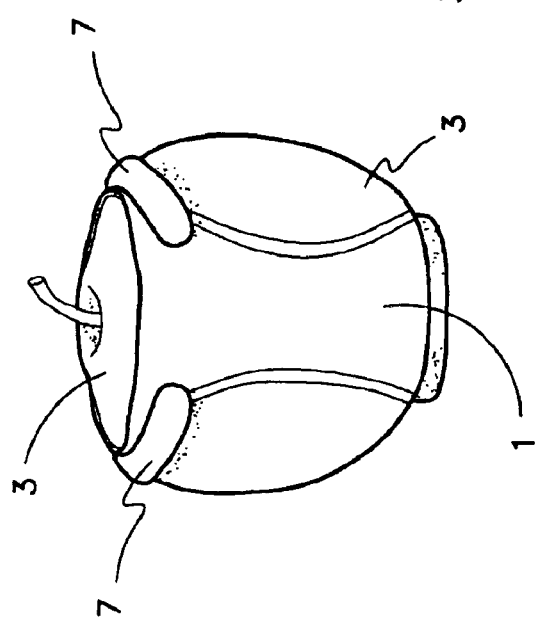
Figure 5A:
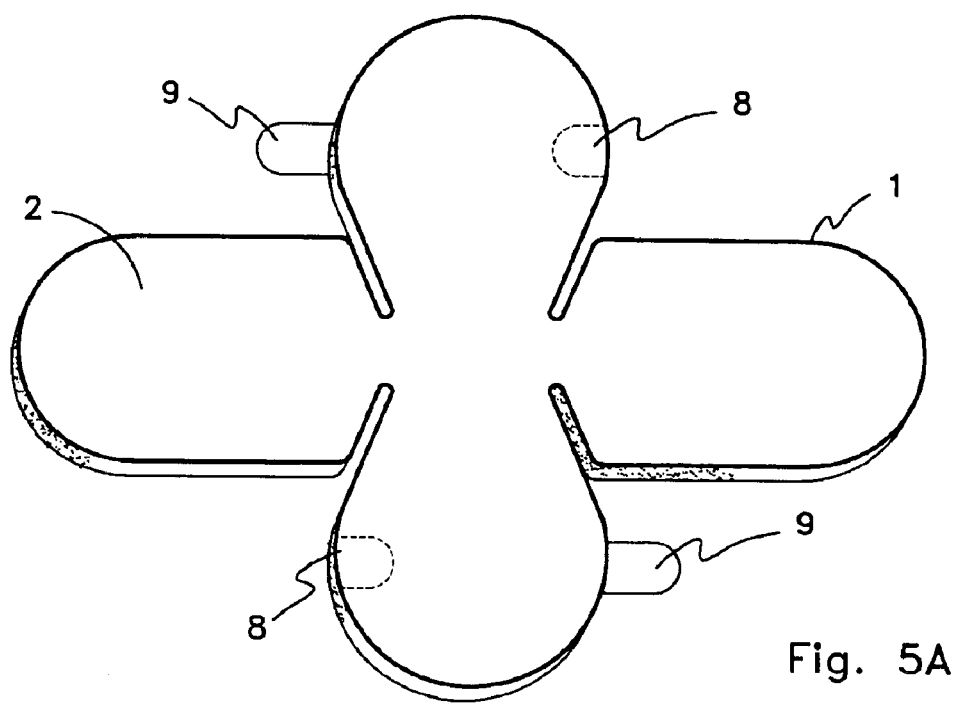
FIGS. 5A and 5B show a particular embodiment of a fruit protector invention that provides a resiliently compressible force absorption material having a substantially planar surface that operably conforms to a portion of the exterior surface of a peach.
Figure 5B:
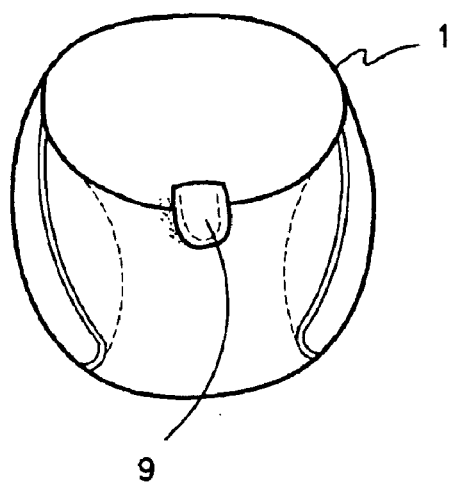
Figure 7B:
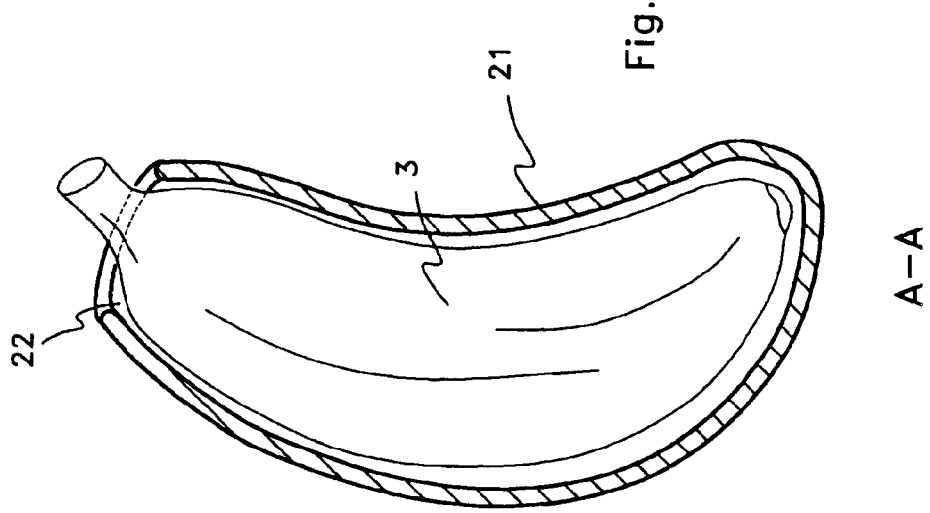
FIGS. 7A and 7B show a particular embodiment of the fruit protector invention that provides a molded force absorption cover that elastically conforms to a portion of the exterior surface of a banana.
Figure 7A:
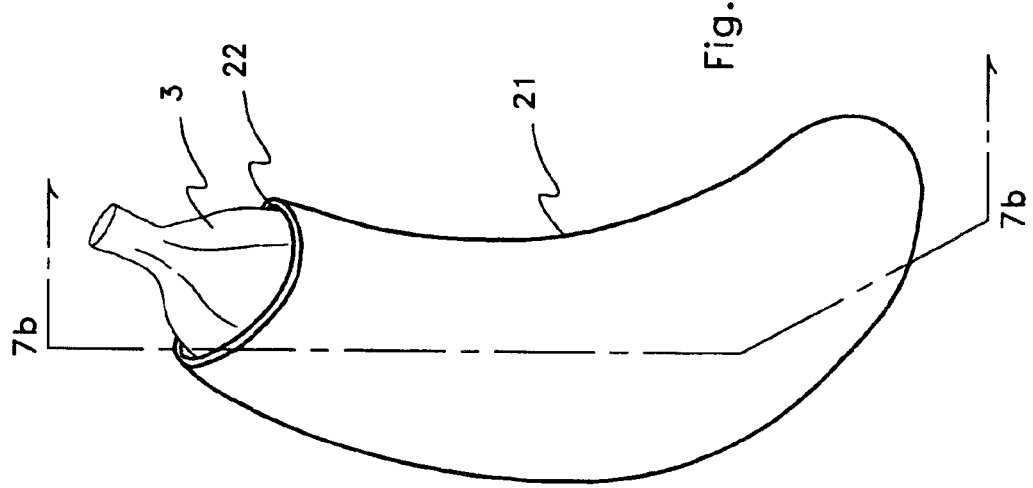
Figures 9A, 9B:
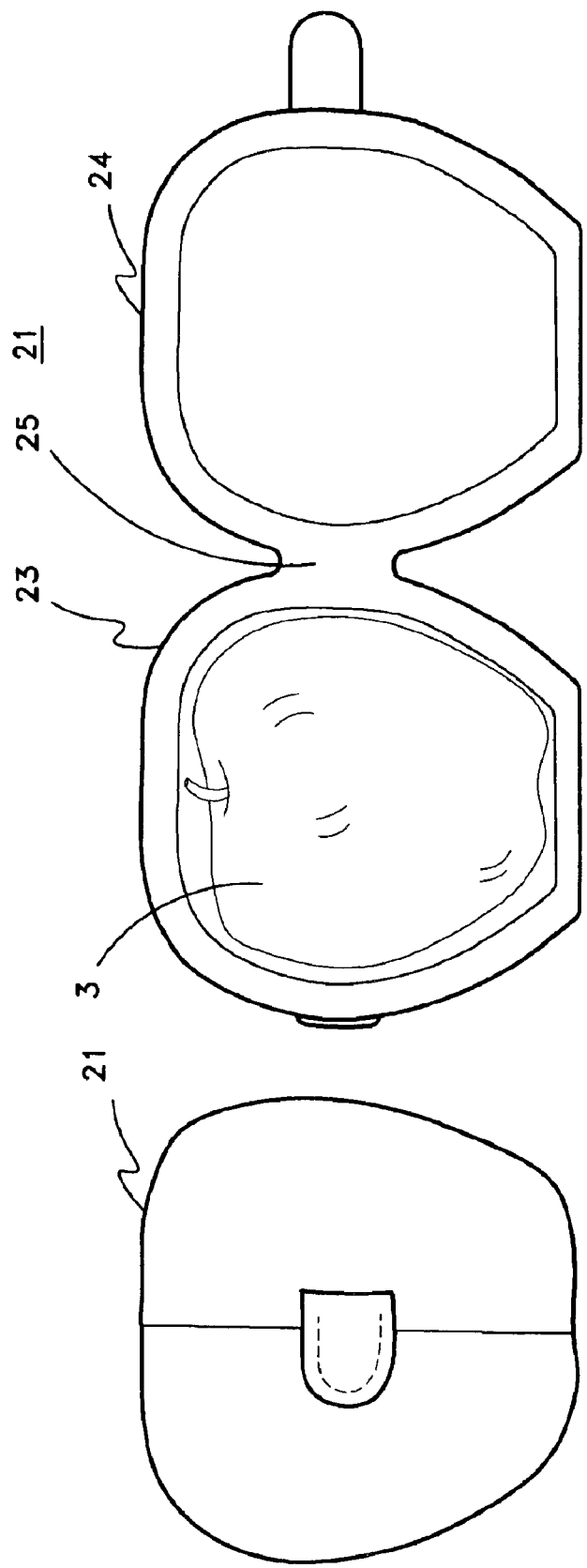
FIGS. 9A and 9B show a particular embodiment of the fruit protector invention that provides a molded force absorption cover that elastically conforms to a portion of the exterior surface of an apple.

As shown by FIGS. 3A–3C, a fruit protector blank (1) having at least one substantially planar surface (2) can be configured to conform to the exterior surface of an apple or apple shaped fruit (3). Additional embodiments of the closure (7) can comprise a flexible sleeve (11) joined to the fruit protector blank (1). The aperture at the terminal end of the flexible sleeve (11) can be closed with a drawstring (12), or could be closed by folding the flexible sleeve.

As shown by FIGS. 5A and 5B and 6A and 6B, a fruit protector blank (1) can be configured to conform to the exterior surface of a peach or peach shaped fruit (3). Similar to other embodiments of the invention, a variety of closures can be used to maintain frictional engagement with the fruit (3). In the embodiment shown by FIGS. 5 and 6, operably mated closure elements (8)(9) comprise a hook material that can mate with a loop material.

Now referring primarily to FIGS. 1A–1C, 2A–2C, 3A–3C, 4A–4C, 5A and 5B, and 6A and B, various embodiments of the fruit protector invention can further comprise layers of material bonded or laminated the surface of the fruit protector blank (1). These additional layers bonded or laminated to the fruit protector blank can be: resilient or compressible sheet material, such as different types of foam material; substantially non-compressible, non-porous, or flexible sheet material (13), such as vinyl plastic sheet as shown by FIG. 2A; material that has a patterned, textured, or an imprinted surface, such as a hand imprint (14) as shown by FIG. 1C; cloth; fabric; or the like, to one or both sides of the fruit protector blank (1).

Lamination or bonding of further layers can be used to combine foam material(s) to the fruit protector blank (1) having different density, compressibility, resiliency, or configuration to obtain the desired operating characteristics, look or feel, or to obtain the desired frictional engagement characteristics between the fruit protector blank (1) and the portion of the exterior surface of the fruit (3) to which it conforms. A flexible adhesive that can be stronger than the layers laminated can be used to bond or laminate layers together.

Non-porous material (13) can be laminated to the fruit protector blank (1) so that the fruit protector blank can be cleaned more readily. An example, of a non-porous material can be sheet vinyl laminated to the surface that conforms with the exterior surface of the fruit or laminated to the opposing planate surface of the fruit protector blank.

Certain embodiments of the invention can further include a friction enhancement surface or friction enhancement element(s) (15) as shown by FIGS. 1A and 1B joined or laminated to one or both sides of the fruit protector blank. Friction enhancement surfaces (15) can be joined to the fruit protector blank in a variety of ways. The resiliently compressible force absorption material from which the fruit protector blank (1) can be cut or can be molded with one or both surfaces of the fruit protector blank to generate raised or relieved patterns, projections, protrusions, bulges, tread, grippers, nubs, or the like to generate increased friction or grip with the exterior surface of the fruit (3) or the fruit protector user's hand.

Other embodiments of the invention can further comprise coloring the resiliently compressible force absorption material from which the fruit protector blank (1) is cut. Color coding the fruit protector blank (1) or fruit protector surface can provide a correspondence between the color of the fruit protector and the fruit (3) it is intended to protect. For example, a banana protector blank or banana protector can be colored yellow, an apple protector red, an orange protector orange, a pear protector green, and so forth. Coloring the resiliently compressible force absorption material can also be useful in attracting consumers to purchase the fruit protector or the corresponding fruit (3).

The invention can further comprise graphic indicia (16) or information printed, applied, or otherwise established on the surface of the fruit protector to aid in identification of the type of fruit (3) a particular fruit protector blank (1) is configured for or can be used with, or to develop market recognition of the fruit protector itself. Some embodiments of the invention can further include nutritional information (17) printed, applied, or established on the surface of the fruit protector blank (1). Warning indicia, such as FRAGILE, or the like can further be applied or otherwise established on the surface of the fruit protector blank.

Light reflective, fluorescent, or phosphorescent elements (18) can be applied, or otherwise established on the surface of the fruit protector blank.

Some embodiments of the invention can further include, a waste material storage (19) coupled to the fruit protector blank (1). The waste material storage (19) can provide a pocket or enclosure as shown in FIG. 2 for storage of waste material. A closure can be coupled to the waste material storage to retain waste material inside the waste material storage (19).

The invention can further include a securement (20) by which the fruit protector can be coupled to a discrete surface, object, article of clothing, container, or transportation means. The securement (20) can comprise a mechanical fastener, such as a clip or clamp, having a pair of discrete compression surfaces to which force is applied in opposing directions, or can comprise a single discrete compression surface opposing the exterior surface of the fruit protector. Alternately, the securement can comprise a clasp as shown by FIG. 1.

Securement as to some embodiments of the invention can comprise a first securement element which operably mates to a second securement element. Various types of operably mated securement elements can be used, such as, a clasp that mates to an eyelet; a hook element that mates with a loop element; a hasp mated to a staple; a latch that engages a catch; or other similar securement elements that contribute a first securement element that can be coupled to a location on the fruit protector and provide a second securement element that can be coupled to a location on the discrete surface. The first and second securement element can in some cases be interchanged. For example, a clasp could be joined to either the discrete surface or to the fruit protector. In other instances, the first and second securement element cannot be interchanged, for example, the belt loop on pair of pants will reasonably require an operably mated clasp coupled to the fruit protector.

With respect to particular embodiments of the invention, fruit (3) retained within the fruit protector can have securement (20) engaged to a article of clothing, garment, or accessory worn by an animal, including, but not limited to a human, a donkey, a burro, a cat, or the like. One embodiment of the invention provides a securement (20) as above-described between the fruit protector and the harness or collar worn by an animal.

Now referring to FIGS. 1A–1C, 2A–2C, 3A–3C, 4A–4C, 5A and 5B, and 6A and B, the numerous embodiments of the fruit protector invention can be used by positioning a fruit (3) such as a banana, an apple, or a pear, or other fruit on the substantially planar surface (2) provide by the resiliently compressible force absorption material that makes up the fruit protector blank (1). The substantially planar surface (2) can then be conformed to a portion of the exterior surface of the fruit (3). Sufficient frictional engagement between the substantially planar surface now conformed to the exterior surface of the fruit (3) can be obtained to retain the fruit within the foam material and a closure (7) can be engaged to maintain the frictional engagement between the conformed fruit protector blank (1) and the exterior surface of the fruit (3).

The fruit (3) can be subsequently removed from the fruit protector by disengaging the closure (7) that maintains frictional engagement between the portion of the exterior surface of the fruit (3) and the substantially planar surface (2) of the resiliently compressible force absorption material conformed to the portion of the exterior surface of the fruit (3). Reducing the frictional engagement between the portion of the exterior of the fruit (3) and the planar surface (2) of the resiliently compressible force absorption material conformed to the exterior surface of the fruit (3) allows the conformed surface of the resiliently compressible foam material to return to a substantially planar surface (2) configuration. The fruit (3) may then be removed from a position on the substantially planar surface (2), inedible waste material from the fruit, such as peels or labels can be removed and the edible portion of the fruit exposed then consumed.

Now referring primarily to FIGS. 7A through 12C, embodiments of the fruit protector invention can comprise a molded force absorption cover (21) elastically conformable to a portion of the exterior surface of numerous types of fruits (3). The molded force absorption cover (21), with respect to some embodiments of the invention, can have a thickness of between about one-eighth inch and one-quarter inch (about two centimeters to about four centimeters). While other types of material can be used, certain embodiments of the invention can be made from foamed materials that provide a range of suitable characteristics to correspond to the type of fruit to be protected or the type of transportation employed with such fruit, including, but not limited to, cell type, cell volume, resilience, compressibility, density, surface texture, or surface configuration. As discussed above, various types of material(s) or polymers(s) or polyols can be foamed including: ethylene vinyl acetate, latex, polypropylene, urethane, polyurethane, olefin, or polyolefin, among others.

Foamable material(s), polyols, or polymers can be foamed and transferred to a mold to cure to the configuration of the mold; or the foamable material, polyols, or polymers, can be transferred to the mold and then foamed and cured to the configuration of the mold. Naturally, depending on the volume and configuration of the mold or the characteristics of the molded fruit protector to be achieved the manner of foaming the material, adding catalyst, and curing of the molded fruit protector can vary accordingly. The molded force absorption cover can be stripped from or removed from the mold.

Various embodiments of the molded fruit protector or molded force absorption cover (21) can be made to elastically conform to substantially the entire exterior surface or a portion of the exterior surface of at least one kind of fruit (3). As shown in FIG. 8, some embodiments of the molded fruit protector invention allow a portion of the exterior surface of the fruit to remain unengaged by the molded force absorption cover.

Now referring primarily to FIGS. 7A and 7B, and 8A–8C, an elastically conformable molded force absorption cover (21) for a banana (3) provides protection against some impact and compression force. While some embodiments of the elastically conformable molded force absorption cover (21) provide a single opening (22) into which the fruit (3) can be inserted, other embodiments of the invention are configured to have a pair of molded elastically conformable force absorption covers (23)(24) that rotate about a hinge (25) having rotation axis (26) to open and close.

Now referring primarily to FIGS. 9A and 9B and FIGS. 10A–10C, an elastically conformable molded force absorption cover (21) for an apple (3) or apple shaped fruit provides protection against some impact and compression forces. The particular embodiment of the invention shown provides another example of a pair of molded elastically conformable force absorption covers (23)(24) that rotate about a hinge (25) having rotation axis (26) to open and close.

Now referring primarily to FIGS. 11A and 11B and 12A–12C, an elastically conformable molded force absorption cover (21) for a pear (3) or pear shaped fruit provides protection against some impact and compression forces. The particular embodiment of the invention shown provides yet another example of a pair of molded elastically conformable force absorption covers (23)(24) that rotate about a hinge (25) to open and close the molded for absorption cover. A closure (7) provides operably mated closure elements (8)(9) which in this embodiment of the invention comprise a loop element joined one of the pair of molded elastically conformable force absorption covers (23) or (24) that rotate about hinge (25) and hook element joined to the second of the pair of molded elastically conformable force absorption covers (23) or (24). In certain embodiments of the invention as shown in FIG. 11 the closure (7) can be configured to represent a leaf or stem of the fruit (3) which the molded force absorption cover (21) protects.

Figure 12C:
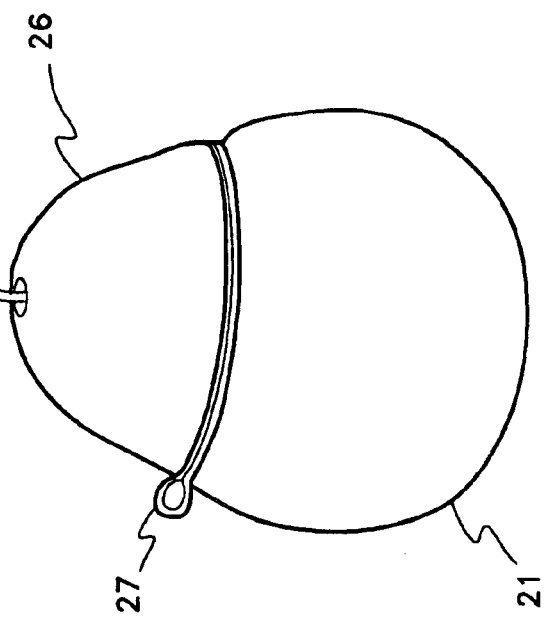
FIGS. 12A–12C show various embodiments of the molded fruit protector invention to protect a pear from some impact and compression forces.
Figure 12B:
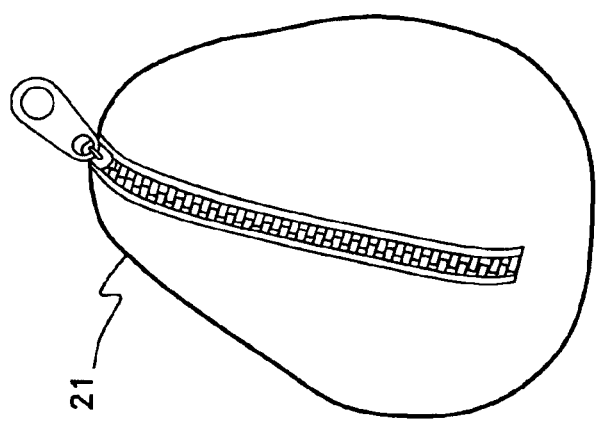
Figure 12A:
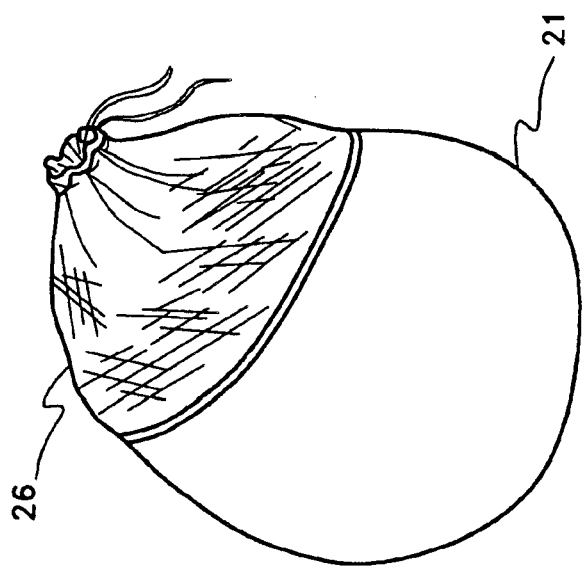

Now referring primarily to FIGS. 8A and 12A and 12C, embodiments of the elastically conformable molded force absorption cover (21) can further include a discrete force absorption cover access element (26) that can be joined, hinged, or tethered (27) to the molded force absorption cover (21). The discrete force absorption cover access element (26) can be a lid or cap that operably mates with a rim or lip to seal in a Tupperware or like manner or can comprise operably mated threads; or the discrete force absorption, cover access element (26) can be a sleeve of fabric having a terminal end closure, such as a drawstring, or operably mated hook and loop. Understandably, other types of discrete operably mated force absorption cover access elements could be utilized.

Figure 13B:
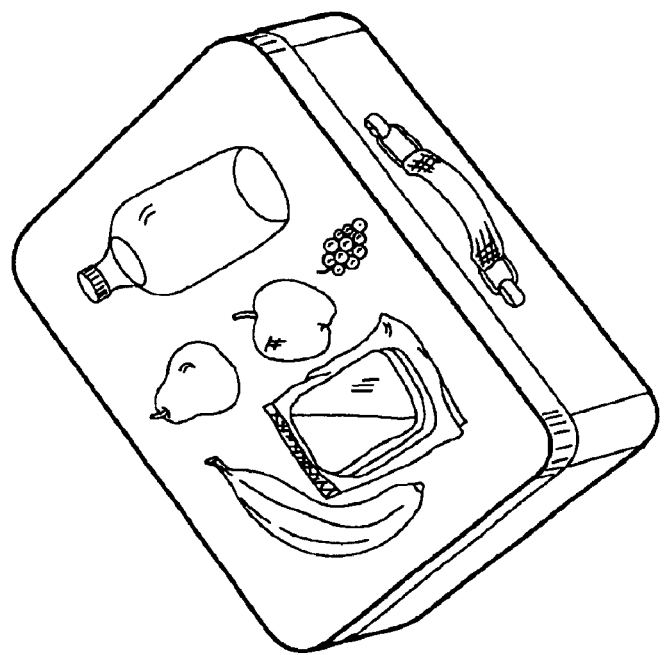
FIGS. 13A and 13B show a particular embodiment of the fruit protector invention that comprises a kit that includes an embodiment of the fruit protector, a container, and a securement between the fruit protector and the container.
Figure 13A:
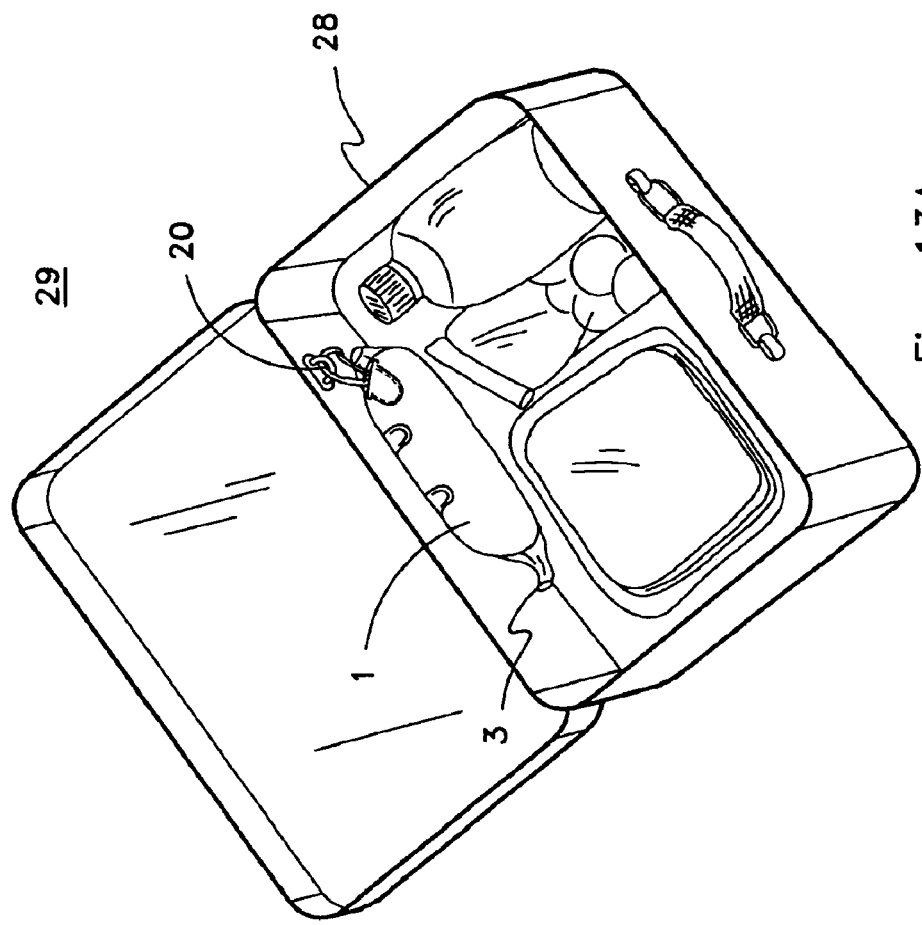

Now referring primarily to FIGS. 13A and 13B, particular embodiments of the invention further include a container (28) to which securement (20) can be responsive. Securment (20) can comprise securement elements wherein a first securement element is coupled to the surface of the fruit protector blank (1) or to the surface of molded force absorption cover (21) and the second securement element coupled to the inside of the container (28). The container (28) can comprise a container for meals, such as plastic container typically used for storage of meals (e.g. Tupperware.RTM. like container) which can have a sealably removable lid; a bag made of a material of sufficient strength and resistance to puncture or tear to allow fruit (3) within a fruit protector to be held within (e.g. Gore-tex.RTM. like or Windstopper-.RTM. like fabrics); a lunch pail or lunch box made of metal, plastic, or the like; or other similar container(s). By securing the fruit protector retaining fruit (3) to the inside of a container (28), or to an article of clothing, a garment, or other accessory, transportation of the fruit is achieved by moving the container or by movement of the animal. An article of clothing, a garment, or other accessory is not mean to limit the invention to those types of clothing or garments that are typically worn, but rather this meant to be generic and meant to include for example children's toys such as belts, tool belts, costumes, uniforms, ammunition holders; jewelry (including toy or children's jewelry or charm bracelets); hand held toys such as water guns, jump ropes, or the like; back packs; purses or totes, or other similar types of accessory items to which a fruit protector could be attached.

Figure 14:
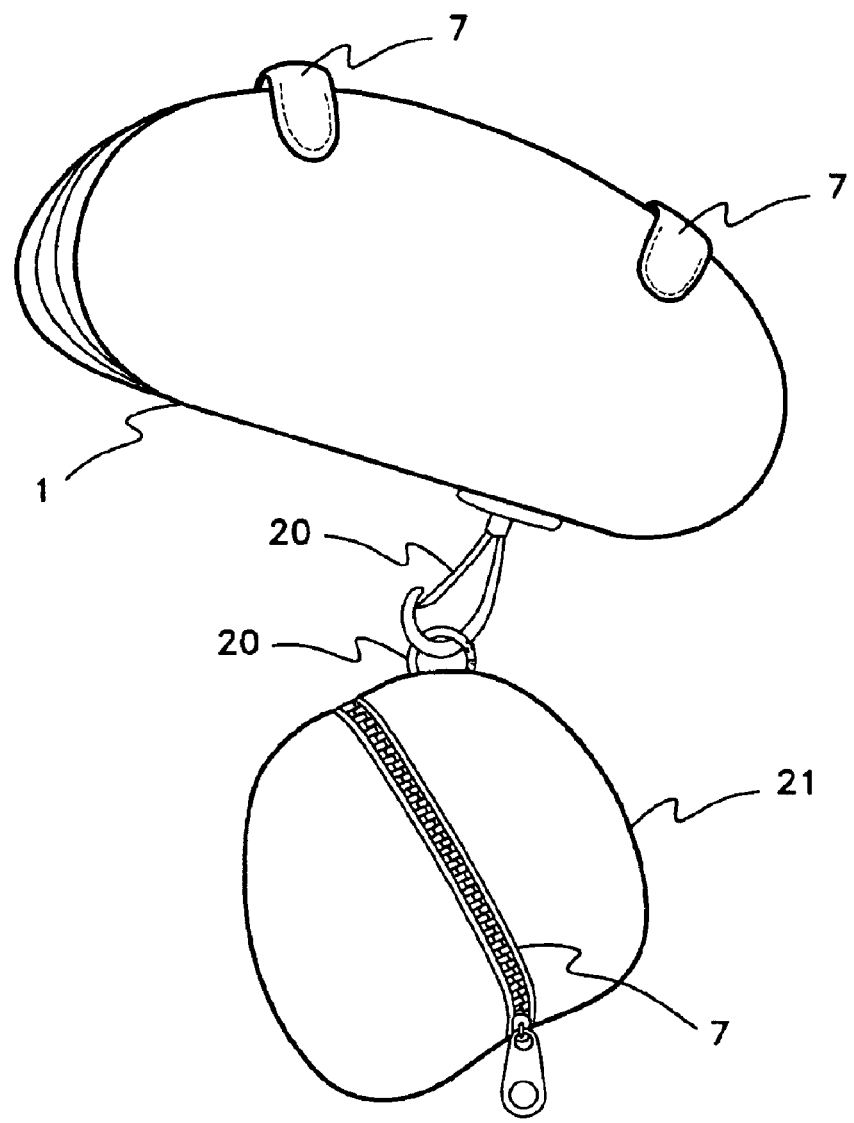
FIG. 14 shows a particular embodiment of the fruit protector invention having a securement configured to be couple together a plurality of individual fruit protectors whether planate or molded embodiments of the invention or both.

Now referring primarily to FIG. 14, embodiments of the invention having securement (20) can be configured to be coupled together. For example, a banana protector can be made responsive to an apple protector. Any number or kind of fruit protectors can be linked together as desired.

Again referring primarily to FIGS. 13A and 13B, the invention can further comprise a kit (29) to protect fruit. The kit can include any of the various embodiments of the fruit protector inventions described above, such as, a fruit protector blank (1) having a resiliently compressible force absorption material having at least one planar surface configured to operably conform to a portion of the exterior surface of a fruit with a closure coupled to the resiliently compressible force absorption material which operates to maintain sufficient frictional engagement between the planar surface of the resiliently compressible force absorption material and the exterior surface of the fruit to retain the fruit within the resiliently compressible force absorption material; or a fruit protector having a molded force absorption cover (21) elastically conformable to a portion of the exterior surface of a fruit; or can be compatible with other types of fruit protection systems.

The kit further includes a container (28) in which a fruit protector or a plurality of fruit protector(s) can be located. The container can be a shipping container, such as boxes, cartons, flats, or the like; or can be a container for meals, such as plastic container typically used for storage of meals (e.g. Tupperware® like container) which can have a sealably removable lid; a bag made of a material of sufficient strength and resistance to puncture or tear to allow fruit within a fruit protector to be held within (e.g. Gore-tex® like or Windstopper® like fabrics); a lunch pail or lunch box made of metal, plastic, or the like; or other similar container.

The kit further includes operably mateable securement (20) between the fruit protector and the container having a first securement element coupled to resiliently flexible force absorption material of the invention or the exterior surface of other types of fruit protection systems that operably mate with a second securement element coupled to the container. Various types of mateable securement or mechanical fasteners can be used, such as, a clasp that mates to an eyelet; a hook element that mates with a loop element; a hasp mated to a staple; a latch having a bar falling or sliding into a catch, groove, or hole; or other similar securement elements or fasteners. The first and second securement element can in some cases be interchanged. For example, the clasp could be joined to either the container or the fruit protector.

Once the fruit (3) is retained within the fruit protector, the fruit protector with the fruit (2) can be secured to the container (28) by mating the first securement element with the second securement element. The securement (20) of the fruit protector to the container (28) provides a tether that reduces movement of the fruit protector within the container.

Figure 16B:
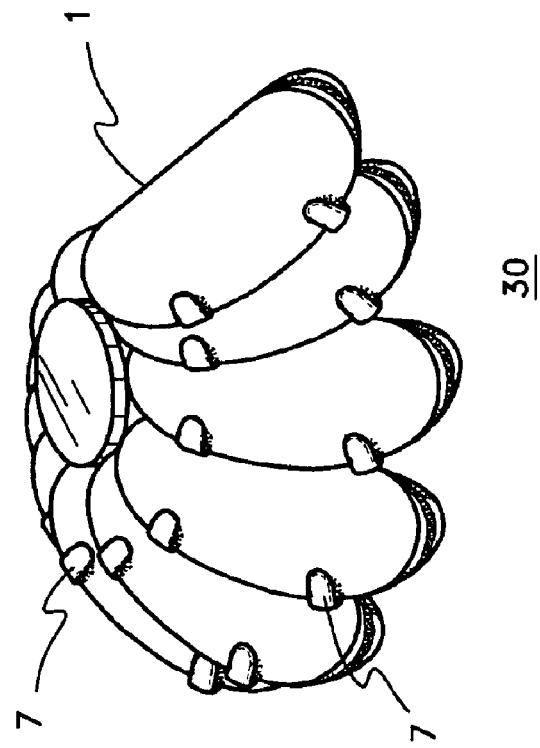
FIGS. 16A and 16B show a particular embodiment of the fruit protector invention that provides a method of marketing fruit in which fruit as shown in FIG. 16A is displayed proximate to a fruit protector or a plurality of fruit protectors as shown by FIG. 16B.
Figure 16A:
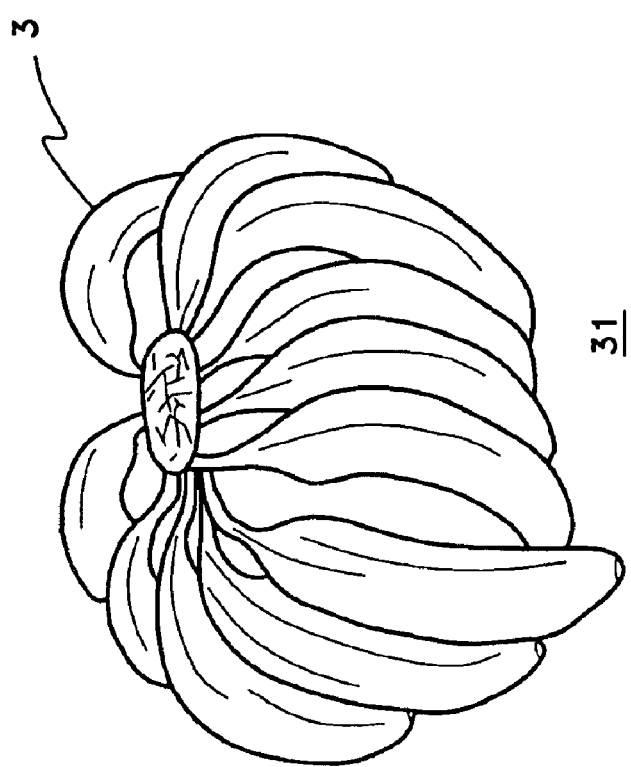

Now referring primarily to FIGS. 16A and 16B, the invention can comprise methods of marketing fruit. In a basic embodiment of the marketing invention, at least one kind of fruit (3) is displayed proximate to one of the fruit protector embodiments of the invention or kit (29) above-described or claimed, or other type of fruit containment (28) or protection system. In some embodiments of the marketing invention, at least one of the fruits (3) displayed corresponds to a fruit protector in which the fruit can be retained, protected, or transported.

Proximately displaying a fruit protector corresponding to at least one kind of fruit (3) can further comprise arranging a plurality of the fruit protectors (30) in a manner similar to the manner in which the fruit is displayed (31). For example, if bananas are displayed in bunches, then the banana fruit protector can be configured in similar bunches and displayed in a manner similar to the bunches of bananas displayed.

Figure 17:
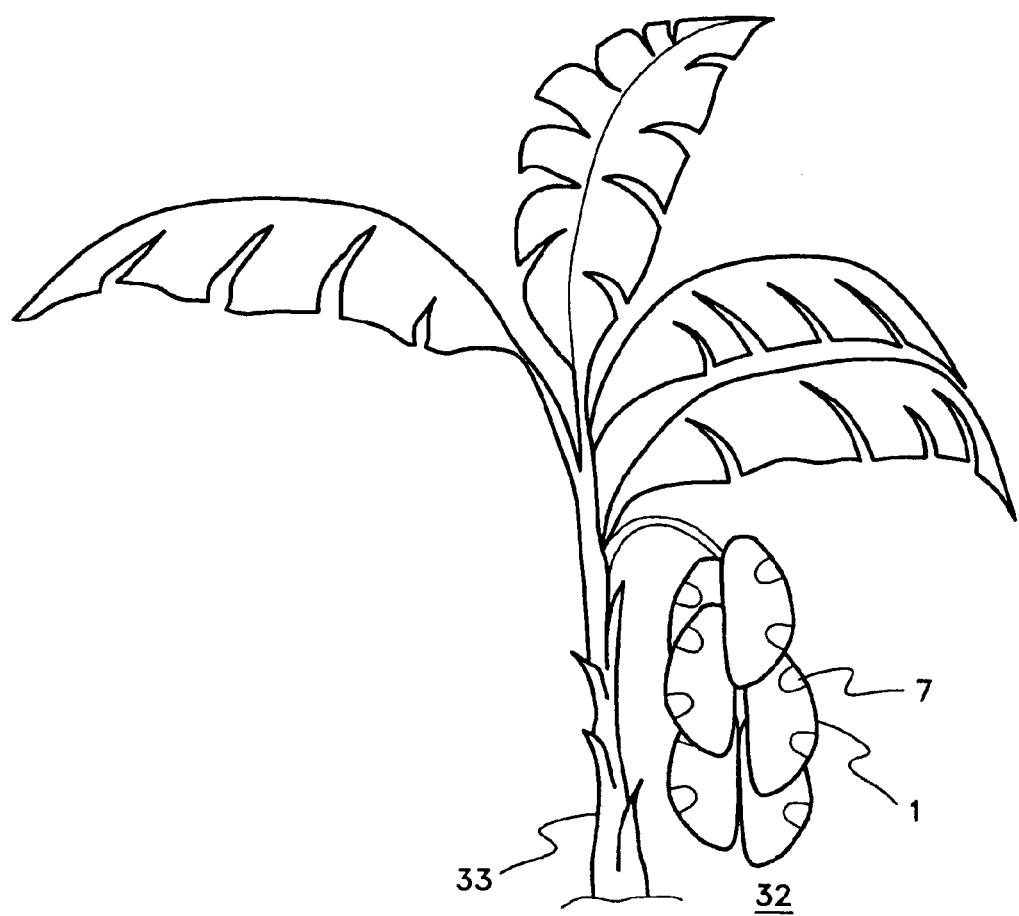
FIG. 17 shows a particular embodiment of the fruit protector invention that provides a method of marketing fruit in which fruit is displayed proximate to fruit protectors arranged in the manner that the fruit grows in the natural environment.

Now referring primarily to FIG. 17, alternately, the fruit protectors can be arranged in the manner that the fruit grows in the natural environment. Again without limiting the invention to bananas only, a bunch of banana protectors (32) could be hung from a artificial banana tree (33). Similarly, apple protectors can be hung from an artificial tree, or similarly pineapple protectors could be supported by an artificial pineapple plant.

Figure 18:
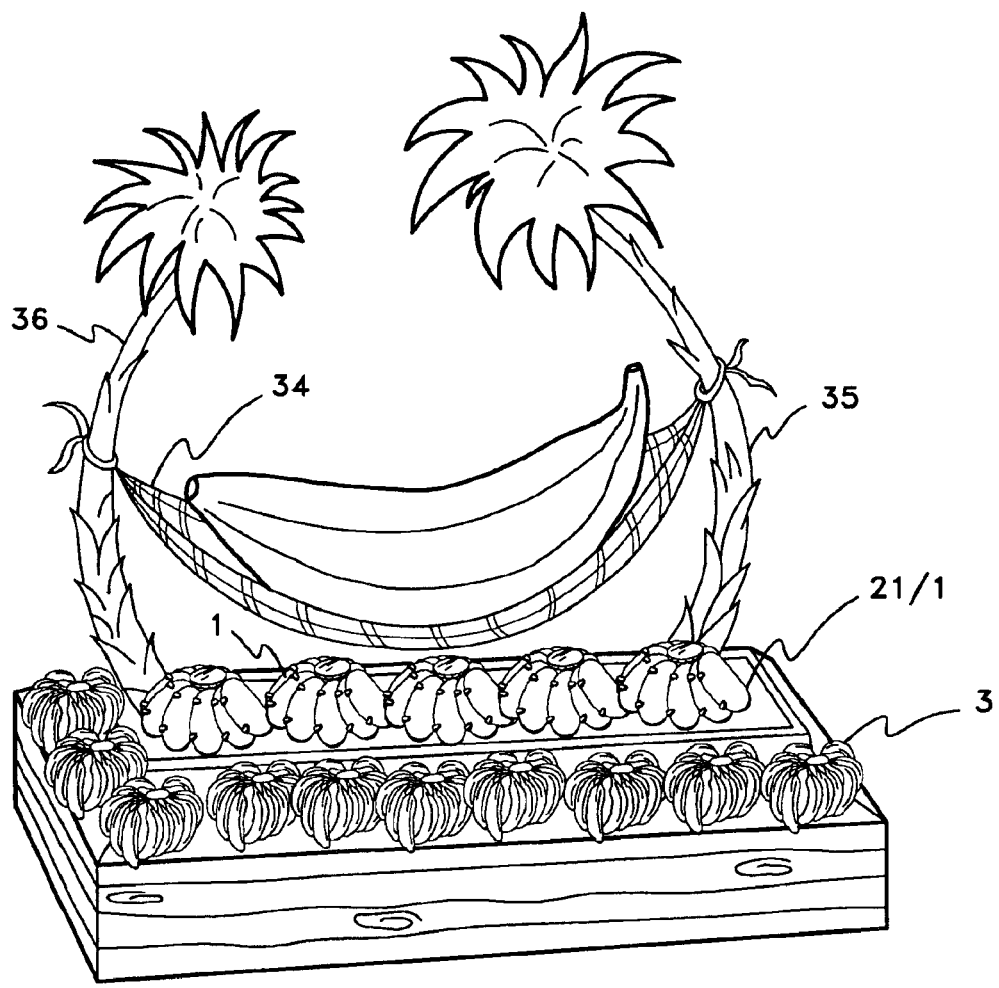
FIG. 18 shows a particular embodiment of the fruit protector invention that provides a method of marketing fruit in which fruit is displayed proximate to a hammock in which fruit protectors are held.

Now referring primarily to FIG. 18, certain embodiments of the fruit marketing invention can further provide that a plurality of fruit protectors can be arranged in a hammock (34) suspended between a pair, or more, of supports (35) (36). The supports could be configured to represent trees in certain embodiments of the invention.

Figure 19B:
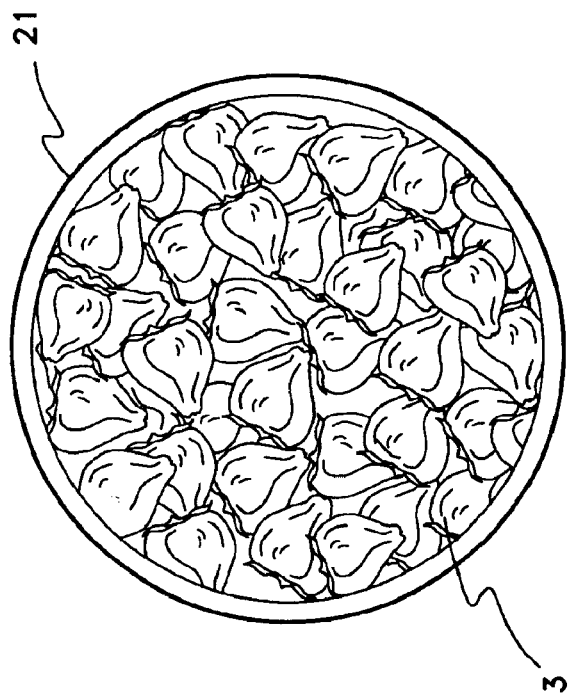
FIGS. 19A and 19B show a particular embodiment of the fruit protector invention that provides a molded fruit protector for loose fruit such as cherries or berries.
Figure 19A:
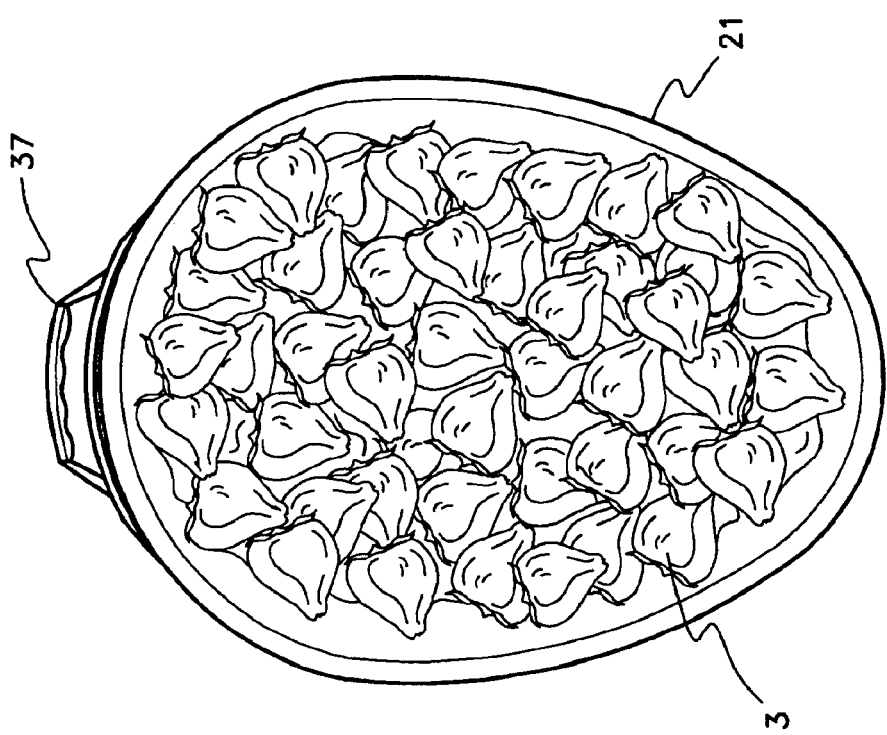

Now referring to FIG. 19, the invention can further comprise a berry or loose fruit protector comprising a molded force absorption cover (21) into which berries (3) can be transferred. A handle (37) can be joined to the fruit protector to allow conveyance of the fruit protector.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in functionally oriented terminology, each aspect of the function can accomplished by a device, subroutine, or program. Apparatus claims may not only be included for the devices described, but also method or process claims may be included to address the functions the invention and each element performs. Neither the description nor the terminology is intended to limit the scope of the claims.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element that causes that action. Similarly, each physical element disclosed should be understood to encompass a disclosure of the action which that physical element facilitates. Regarding this last aspect, as but one example, the disclosure of a "fruit protector" should be understood to encompass disclosure of the act of "protecting fruit"—whether explicitly discussed or not— and, conversely, were there only disclosure of the act of "protecting fruit", such a disclosure should be understood to encompass disclosure of a "fruit protector" and even a "means for protecting fruit". Such changes and alternative terms are to be understood to be explicitly included in the description. Additionally, the various combinations and permutations of all elements or applications can be created and presented. All can be done to optimize the design or performance in a specific application.

Any acts of law, statutes, regulations, or rules mentioned in this application for patent; or patents, publications, or other references mentioned in this application for patent, are each hereby incorporated by reference. Specifically, U.S. Provisional Patent Application No. 60/302,107, filed Jun. 28, 2001 is hereby incorporated by reference including any figures or attachments.

In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. However, as to each of the above, to the extent that such information or statements incorporated by reference might be considered inconsistent with the patenting of this/these invention(s) such statements are expressly not to be considered as made by the applicant(s).

In addition, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like.

Thus, the applicant(s) should be understood to have support to claim at least: i) each of the fruit protectors as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, and x) the various combinations and permutations of each of the elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the subject matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

I claim:

1. A method of protecting a fruit, comprising the steps of:
   a. positioning said fruit on a substantially planar surface of a resiliently compressible force absorption material;
   b. conforming said substantially planar surface of said resiliently compressible force absorption material to a portion of the exterior surface of said fruit;
   c. obtaining sufficient frictional engagement between said substantially planar surface of said resiliently compressible force absorption material conformed to said portion of the exterior surface of said fruit to retain said fruit within said resiliently compressible force absorption material; and
   d. engaging a closure to maintain said sufficient frictional engagement between said planar surface of said resiliently compressible force absorption material conformed to said portion of the exterior surface of said fruit to retain said fruit within said resiliently compressible force absorption material.

2. A method of protecting a fruit as described in claim 1, wherein said fruit is selected from the group consisting of a peach, an apricot, a plums, an apple, a banana, a quince, a persimmon, a bread fruit, a carambola, a guava, a pear, a paw paw, a star fruit, a papaya, a mango, an ugli fruit, a watermelon, a cantaloupe, a pomegranate, a pineapple, a mango, an avocado, an orange, a tangerine, a grapefruit, a lime, a lemon, a tomato, a tomatilla, a kiwi, and a bunch of grapes.

3. A method of protecting a fruit as described in claim 1, wherein said closure comprises a discrete closure having operably mated closure elements coupled to said resiliently compressible force absorption material.

4. A method of protecting a fruit as described in claim 1, further comprising the step of locating said fruit retained within said resiliently compressible force absorption material within a food container.

5. A method of protecting a fruit as described in claim 4, further comprising the step of securing said fruit retained within said resiliently compressible force absorption material to a location within said food container.

6. A method of protecting a fruit as described in claim 5, wherein said step of securing said fruit retained within said resiliently compressible force absorption material to a location within said food container comprises the step of engaging operably mated securement elements.

7. A method of protecting a fruit as described in claim 6, wherein said step of engaging operably mated securement elements comprises the step of mating a clasp responsive to said resiliently compressible force absorption material to an eyelet joined at said location within said food container.

8. A method of protecting a fruit as described in claim 6, wherein said step of engaging operably mated securement elements comprises the step of mating a clasp joined at said location within said food container to an eyelet responsive to said force absorption material.

9. A method of protecting a fruit as described in claim 6, wherein said food container is selected from the group consisting of a fabric bag, a plastic container, and a lunch box.

10. A method of protecting a fruit as described in claim 4, further comprising the step of transporting said fruit retained within said resiliently compressible force absorption material through movement of said container.

11. A method of protecting a fruit as described in claim 1, further comprising the step of securing said fruit retained within said resiliently compressible force absorption material to a location on a garment.

12. A method of protecting a fruit as described in claim 11, wherein said step of securing said fruit retained within said resiliently compressible force absorption material to a location on a garment comprises the step of engaging operably mated securement elements.

13. A method of protecting a fruit as described in claim 12, wherein said step of engaging operably mated securement elements comprises the step of mating a clasp responsive to said compressible force absorption material to an eyelet joined at said location on said garment.

14. A method of protecting a fruit as described in claim 12, wherein said step of engaging operably mated securement elements comprises the step of mating a clasp joined at said location on said garment to an eyelet responsive to said force absorption material.

15. A method of protecting a fruit as described in claim 12, wherein said step of engaging operably mated securement elements comprises the step of compressing a portion of material of said garment between a first surface and a second surface of a compression element responsive to said resiliently compressible force absorption material.

16. A method of protecting a fruit as described in claim 11, wherein said garment is adapted to be worn by an animal selected from the group consisting of a human, a horse, a donkey, a burro, a dog, and a cat.

17. A method of protecting a fruit as described in claim 16, further comprising the step of transporting said fruit retained within said resiliently compressible force absorption material through movement of said garment adapted to be worn by an animal.

18. A method of protecting a fruit as described in claim 1, further comprising the step of coloring a portion of said substantially planar surface of said resiliently compressible force absorption material which conforms to said portion of the exterior surface of said fruit.

19. A method of protecting a fruit as described in claim 1, further comprising the step of coloring said resiliently compressible force absorption material.

20. A method of protecting a fruit as described in claim 1, further comprising the step of increasing reflectivity of a portion of said resiliently compressible force absorption material.

21. A method of protecting a fruit as described in claim 1, further comprising the step of establishing warning indicia on a portion of the exterior surface of said force absorption material.

22. A method of protecting a fruit as described in claim 1, further comprising the step of engaging friction enhancement elements coupled to said substantially planar surface with the exterior surface of said fruit to enhance said frictional engagement between said substantially planar surface of said resiliently compressible force absorption material conformed to said portion of the exterior surface of said fruit.

* * * * *